(12) United States Patent
Yasukawa

(10) Patent No.: US 7,847,871 B2
(45) Date of Patent: *Dec. 7, 2010

(54) ELECTRO-OPTICAL DEVICE AND ELECTRONIC APPARATUS

(75) Inventor: Masahiro Yasukawa, Chino (JP)

(73) Assignee: Seiko Epson Corporation, Tokyo (JP)

( * ) Notice: Subject to any disclaimer, the term of this patent is extended or adjusted under 35 U.S.C. 154(b) by 226 days.

This patent is subject to a terminal disclaimer.

(21) Appl. No.: 12/141,581

(22) Filed: Jun. 18, 2008

(65) Prior Publication Data

US 2009/0051840 A1 Feb. 26, 2009

(30) Foreign Application Priority Data

Aug. 22, 2007 (JP) ............................. 2007-215763

(51) Int. Cl.
*G02F 1/1343* (2006.01)
(52) U.S. Cl. .............................. 349/39; 349/19; 349/33; 349/38
(58) Field of Classification Search .................. 349/19, 349/33, 38, 39
See application file for complete search history.

(56) References Cited

U.S. PATENT DOCUMENTS

2009/0065780 A1* 3/2009 Yasukawa et al. ............. 257/71

FOREIGN PATENT DOCUMENTS

| JP | 05-34718 | 2/1993 |
|---|---|---|
| JP | 08-234239 | 9/1996 |
| JP | 10-010548 | 1/1998 |
| JP | 2000-131716 | 5/2000 |
| JP | 3106566 | 11/2000 |
| JP | 3141860 | 3/2001 |
| JP | 2002-149087 | 5/2002 |
| JP | 3307144 | 7/2002 |
| JP | 2002-297060 | 10/2002 |
| JP | 2005-045017 | 2/2005 |

* cited by examiner

*Primary Examiner*—Jennifer Doan
(74) *Attorney, Agent, or Firm*—AdvantEdge Law Group, LLC

(57) ABSTRACT

An electro-optical device includes a plurality of storage capacitors each in a corresponding pixel. Each storage capacitor includes a first capacitor electrode and a second capacitor electrode with a dielectric film therebetween. The first capacitor electrode is made of the same film as one of the semiconductor films in pixel transistors. The second capacitor electrode is provided at a layer over the gate electrode of the pixel transistors. The second capacitor electrode has a first main portion opposite to the first capacitor electrode and an extending portion that extends from the first main portion to at least partially cover the second junction region. An interlayer insulation film insulates the extending portion from the pixel transistor.

11 Claims, 10 Drawing Sheets

ELECTRO-OPTICAL DEVICE AND ELECTRONIC APPARATUS

BACKGROUND

1. Technical Field

The present invention relates to an electro-optical device suck as a liquid crystal device or the like. In addition, the invention further relates to an electronic apparatus that is provided with an electro-optical device. An example of a variety of electronic apparatuses to which the invention can be applied includes but not limited to a liquid crystal projector.

2. Related Art

In a typical configuration of an electro-optical device of the related art, a pixel electrode is provided at an open region of each pixel, whereas a transistor that functions as a switching element for switch-controlling the pixel electrode and a storage capacitor that temporarily retains/holds the electric potential of the pixel electrode are formed in a non-open region of each pixel. In a lamination structure formed over a substrate according to the configuration of an electro-optical device disclosed in JP-A-2005-45017 or Japanese Patent No. 3,141,860, a storage capacitor is formed at a layer that is not the same as the layer of a transistor.

In contrast, with an aim to simplify the manufacturing process of an electro-optical device, a storage capacitor having a so-called "planar structure" is disclosed in JP-A-10-10548, JP-A-2002-297060, JP-A-2002-149087, Japanese Patent No. 3,106,566, and Japanese Patent No. 3,307,144. In the planar structure disclosed in JP-A-10-10548, JP-A-2002-297060, JP-A-2002-149087, Japanese Patent No. 3,106,566, and Japanese Patent No. 3,307,144, one electrode of the storage capacitor and the semiconductor layer of a transistor are formed as the same single film. Specifically, in the planar structure disclosed in JP-A-2002-297060, Japanese Patent No. 3,106,566, and Japanese Patent No. 3,307,144, a storage capacitor is made up of a lower capacitor electrode that is made of the same film as the semiconductor layer of a transistor, an upper capacitor electrode that is made of the same film as the gate electrode of the transistor, and a dielectric film that is made of the same film as the gate insulation film of the transistor. In such a configuration, the dielectric film is deposited between the lower capacitor electrode and the upper capacitor electrode. On the other hand, in the planar structure disclosed in JP-A-10-10548 or JP-A-2002-149087, the lower capacitor electrode of a storage capacitor is made of the same film as a light-shielding film that is deposited below a semiconductor layer, whereas the upper capacitor electrode of the storage capacitor is made of the same film as the semiconductor layer.

If the area size of a non-open region is made smaller in order to achieve a high numerical aperture as viewed in two dimensions over a substrate when the planar structure of a storage capacitor according to the above-identified JP-A-2002-297060, Japanese Patent No. 3,106,566, and Japanese Patent No. 3,307,144 is adopted, there is an adverse possibility that the upper capacitor electrode thereof and a gate electrode are arrayed in close proximity to each other in a plan view. As a result thereof, there is a risk of a short-circuit failure that could occur between the upper capacitor electrode thereof and the gate electrode. In addition to such a disadvantage, according to the above-described layer structure, it is practically impossible, or at best difficult, to shut off any incident light beam that propagates toward the semiconductor layer through upper layers formed above the semiconductor layer by means of the upper capacitor electrode.

In the planar structure disclosed in the above-identified JP-A-10-10548, one capacitor electrode is made of the same film as a semiconductor layer whereas another capacitor electrode is formed above the semiconductor layer in such a manner that the above-mentioned one capacitor electrode and the above-mentioned another capacitor electrode are formed opposite to each other. Accordingly, in the planar structure disclosed in the above-identified JP-A-10-10548, a storage capacitor having a dual-layer structure is formed. If the planar structure disclosed in the above-identified JP-A-10-10548 is adopted, it is necessary to connect still another capacitor electrode that is made of the same film as a light-shielding film to a ground potential in order to prevent any leakage current from occurring. For this reason, in the planar structure disclosed in the above-identified JP-A-10-10548, it is practically impossible or at best difficult to achieve a small difference between the electric potential of the above-mentioned still another capacitor electrode that is made of the same film as the light-shielding film and the upper-layer capacitor electrode that is made of the same film as the semiconductor layer. Since it is not possible to achieve a small electric potential difference therebetween, it is practically impossible or at best difficult to make the thickness of a dielectric film small. Since it is impossible to provide a thin dielectric film therebetween, the planar structure disclosed in the above-identified JP-A-10-10548 has a disadvantage in that it is practically impossible or at best difficult to achieve a large capacitance value of a storage capacitor.

Moreover, if the planar structure disclosed in JP-A-10-10548 or JP-A-2002-149087 is adopted, it is practically impossible or at best difficult to shut off any incident light beam that propagates toward the semiconductor layer through upper layers formed above the semiconductor layer by means of the upper capacitor electrode; in like manner, it is practically impossible or at best difficult to shut off any incident light beam that propagates toward the semiconductor layer through lower layers formed below the semiconductor layer by means of the lower capacitor electrode. Therefore, the planar structure disclosed in JP-A-10-10548 or JP-A-2002-149087 has a disadvantage in that an optical leakage current could occur due to an incident light beam that reaches the semiconductor layer, resulting in degradation in image display quality.

SUMMARY

An advantage of some aspects of the invention is to provide an electro-optical device that has a storage capacitor having a planar structure and is capable of increasing numerical aperture in an easy manner while completely preventing or at least reducing the occurrence of any optical leakage current at, for example, a transistor in each pixel thereof. In addition, the invention further provides, as an advantage of some aspects thereof, an electronic apparatus that is provided with such an electro-optical device.

In order to address the above-identified problem without any limitation thereto, the invention provides, as a first aspect thereof, an electro-optical device that includes: a plurality of data lines and a plurality of scanning lines that intersect each other, the plurality of data lines and the plurality of scanning lines being formed over a substrate; a plurality of pixel electrodes each of which is formed in a pixel over the substrate at a position corresponding to an intersection formed by the data line and the scanning line; a plurality of transistors that is formed over the substrate, each of the plurality of transistors being formed in a pixel, each of the plurality of transistors including a semiconductor film and a gate electrode, the semiconductor film of the transistor having a channel region, a data-line-side source/drain region that is electrically connected to the data line, a pixel-electrode-side source/drain region that is electrically connected to the pixel electrode, a first junction region that is formed between the channel region and the data-line-side source/drain region, and a second junction region that is formed between the channel region and the pixel-electrode-side source/drain region, the gate electrode of the transistor overlapping the channel region; and a plurality of first storage capacitors each of which is formed in a pixel over the substrate, each of the plurality of first storage capacitors having a first capacitor electrode that is made of the same film as the semiconductor film and further having a second capacitor electrode that is provided at a layer over the gate electrode and opposite to the first capacitor electrode with a first dielectric film being formed between the first capacitor electrode and the second capacitor electrode, wherein the second capacitor electrode has a first main portion that is formed opposite to the first capacitor electrode and further has an extending portion that extends from the first main portion in such a manner that the extending portion at least partially covers the second junction region, the extending portion being interlayer-insulated from the transistor.

According to an electro-optical device of the first aspect of the invention described above, an image signal supplied through a data line to a pixel electrode is controlled for each pixel, thereby making it possible to perform image display conforming to a so-called active matrix scheme. An image signal is supplied from the data line to the pixel electrode via a transistor at a predetermined timing as the transistor is turned ON/OFF in accordance with a scanning signal that is supplied thereto through a scanning line. The transistor serves as a switching element that is electrically connected between the data line and the pixel electrode. A plurality of pixel electrodes is provided in a matrix arrangement pattern in a region that functions as a display area over the substrate. In such a matrix array pattern, each of the pixel electrodes is provided at a position that corresponds to an intersection of the data line and the scanning line.

In each of the plurality of pixels, the pixel electrode is provided in an open region, whereas the data line, the scanning line, the transistor, and the first storage capacitor are provided in a non-open region. The term "open region" means an area in each pixel that transmits or reflects light that actually contributes to image display.

The transistor has a semiconductor film (i.e., semiconductor layer) that includes a channel region, a data-line-side source/drain region, and a pixel-electrode-side source/drain region. In addition, the transistor has a gate electrode that overlaps the channel region. In addition, a first junction region is formed between the channel region and the data-line-side source/drain region of the semiconductor layer (i.e., semiconductor film), whereas a second junction region is formed between the channel region and the pixel-electrode-side source/drain region of the semiconductor layer. Assuming that the transistor has an LDD structure, though not necessarily limited thereto, each of the first junction region and the second junction region is formed as an LDD region. That is, each of the first junction region and the second junction region is formed as an impurity region that is formed by implanting impurities into the semiconductor layer by using, for example, an ion implantation method, or other similar alternative technique. According to such an LDD-junction-region structure having an impurity region, it is possible to reduce the amount of an OFF-state current that flows between the source region and the drain region during the non-operating time of the transistor, and also to suppress the decrease of an ON-state current that flows during the operating time of the transistor.

In the configuration of an electro-optical device according to the first aspect of the invention described above, at least one first storage capacitor having a planar structure is formed in each pixel. Specifically, the first storage capacitor has a first capacitor electrode that is made of the same film as a semiconductor film and further has a second capacitor electrode that is provided above a gate electrode. The first capacitor electrode functions as the lower capacitor electrode of the first storage capacitor. The second capacitor electrode functions as the upper capacitor electrode of the first storage capacitor. In the context of this specification and appended claims, the term "same film" means two (or more) films that are formed concurrently with each other (or one another) in the same single film formation process. Thus, it means the same single kind of film. It is preferable that the first capacitor electrode should be formed as a part of the pixel-electrode-side source/drain region of a semiconductor film. That is, the first capacitor electrode functions as a pixel-electric-potential-side capacitor electrode, the electric potential of which is kept at a pixel electric potential at the time of the operation of an electro-optical device.

The first main portion of the second capacitor electrode is provided opposite to the first capacitor electrode. That is, the first main portion of the second capacitor electrode functions as the upper capacitor electrode. The second capacitor electrode is electrically connected to a capacitor line. The second capacitor electrode is further electrically connected to, for example, a constant potential source via the capacitor line. With such an electric connection, the electric potential of the second capacitor electrode is maintained at a predetermined constant potential. Therefore, the first main portion of the second capacitor electrode can function as a constant-potential-side capacitor electrode. A first dielectric film is provided between the first main portion of the second capacitor electrode and the first capacitor electrode.

The second capacitor electrode has an extending portion that extends from the first main portion thereof. When viewed in two dimensions over a substrate, the extending portion of the second capacitor electrode at least partially overlaps the second junction region of the semiconductor film. It is preferable that at least the extending portion of the second capacitor electrode should be made of a light-shielding material having light-shielding property.

In the configuration of an electro-optical device according to the first aspect of the invention described above, the second capacitor electrode is formed at a layer over the gate electrode. For this reason, in comparison with a planar structure of the related art that has already been explained above, an electro-optical device according to the first aspect of the invention described above offers an advantage in that it is unlikely that any short-circuit failure occurs between the second capacitor electrode and the gate electrode even if the second capacitor electrode and the gate electrode are arrayed in close proximity to each other when viewed in two dimensions. Thus, the configuration of an electro-optical device according to the first aspect of the invention described above makes it possible to reduce, in the two-dimensional layout of a pixel, restrictions based on the relative array positions of the first main portion of the second capacitor electrode and the gate electrode, thereby making it further possible to easily adjust the layout area of a non-open region. As a result thereof, it is possible to heighten/increase numerical aperture, that is, opening ratio by making the area size of the non-open region smaller and thereby making the area size of the open region larger.

At the time of the operation of a transistor, there is a relatively greater possibility of the occurrence of an optical leakage current in the second junction region than in the first junction region as any incident light beam propagates toward the semiconductor film. In the configuration of an electro-optical device according to the first aspect of the invention described above, the extending portion of the second capacitor electrode at least partially overlaps the second junction region of the semiconductor film. By this means, it is possible to shut off any incident light beam entering from the upper-layer side toward the second junction region of the semiconductor film. Therefore, it is possible to improve the light-shielding performance of the non-open region for protection of the transistor, thereby preventing the occurrence of any optical leakage current in a more reliable manner. As a result thereof, it is possible to avoid any display failure from occurring due to the malfunction of the transistor and/or flickers, though not limited thereto. Thus, an electro-optical device according to the first aspect of the invention described above features enhanced display quality.

Moreover, since the first storage capacitor has a planar structure, in comparison with the configuration of a storage capacitor of the related art that is disclosed in the aforementioned unexamined Japanese patent application publication of JP-A-2005-45017 or the aforementioned Japanese patent gazette 3,141,860, an electro-optical device according to the first aspect of the invention described above makes it possible to achieve a simpler manufacturing process.

It is preferable that an electro-optical device according to the first aspect of the invention described above should further include a first interlayer insulation film that is provided at a layer over the transistor but under the second capacitor electrode, the first interlayer insulation film insulating the extending portion of the second capacitor electrode from the transistor, wherein the first interlayer insulation film has a first opening at an area where the first main portion of the second capacitor electrode is formed.

In the preferred configuration of an electro-optical device according to the first aspect of the invention described above, the first main portion of the second capacitor electrode is formed in the first opening. If the thickness of the first dielectric film is formed to be relatively thin inside the first opening, it is possible to make the capacitance value of the first storage capacitor relatively large. As a result thereof, it is possible to make the amount of electric charge that is accumulated/stored at the first storage capacitor relatively large.

In the preferred configuration of an electro-optical device according to the first aspect of the invention described above, the first dielectric film may be made of the same film as a gate insulation film. In such a modified configuration, the first dielectric film that is made of the same film as the gate insulation film is formed over the first capacitor electrode. Accordingly, in such a modified configuration, the first opening of the first interlayer insulation film partially exposes the surface of the first dielectric film that is made of the same film as the gate insulation film. Assuming that the first capacitor electrode is formed as a part of the pixel-electrode-side source/drain region of the semiconductor film, though not necessarily limited thereto, such a modified configuration makes it unnecessary to provide the first dielectric film in addition to the gate insulation film because a part of the gate insulation film functions as the first dielectric film according to an aspect of the invention in the first opening in place of the first dielectric film.

Therefore, such a modified preferred configuration of an electro-optical device according to the first aspect of the invention described above makes it possible to simplify the manufacturing process thereof.

In the configuration of an electro-optical device according to the first aspect of the invention described above, it is preferable that the second capacitor electrode should have more than one first main portion that is mentioned above.

In the preferred configuration of an electro-optical device according to the first aspect of the invention described above, each of the plurality of first main portions of the second capacitor electrode is provided opposite to the first capacitor electrode. Such a preferred configuration is advantageous in that it is possible to form more than one first storage capacitors, thereby making it further possible to accumulate/store a relatively large amount of electric charge thereat.

It is preferable that an electro-optical device according to the first aspect of the invention described above should further include a third capacitor electrode that is provided at a layer over the second capacitor electrode, the third capacitor electrode being provided opposite to the first main portion of the second capacitor electrode with a second dielectric film being formed between the third capacitor electrode and the first main portion of the second capacitor electrode.

In the preferred configuration of an electro-optical device according to the first aspect of the invention described above, the first main portion of the second capacitor electrode is sandwiched between the first capacitor electrode, which is formed at the lower-layer-side thereof, and the third capacitor electrode, which is formed at the upper-layer-side thereof. A part of the first dielectric film is formed between the first capacitor electrode and the first main portion of the second capacitor electrode. The second dielectric film is formed between the first main portion of the second capacitor electrode and the third capacitor electrode. Therefore, it is possible to form the first storage capacitor as a dual-layer storage capacitor. Thus, in comparison with a case where the first storage capacitor is made up only of the first capacitor electrode and the second capacitor electrode that are provided opposite to each other, such a preferred configuration of an electro-optical device according to the first aspect of the invention described above makes it possible to accumulate (i.e., store) a larger amount of electric charge at the dual-layer first storage capacitor.

It is preferable that an electro-optical device according to the first aspect of the invention described above should further include a second storage capacitor that has a third capacitor electrode that is provided at a layer over the second capacitor electrode, the third capacitor electrode being provided opposite to the second capacitor electrode with a second dielectric film being formed between the third capacitor electrode and the second capacitor electrode, wherein a second main portion of the second capacitor electrode that extends from the first main portion of the second capacitor electrode is formed opposite to the third capacitor electrode.

In the preferred configuration of an electro-optical device according to the first aspect of the invention described above, electric charge is accumulated/stored at the upper-layer second storage capacitor in addition to the lower-layer first storage capacitor. Therefore, it is possible to accumulate/store a larger amount of electric charge at the first storage capacitor and the second storage capacitor.

It is preferable that an electro-optical device having the preferred dual-layer configuration according to which the first storage capacitor is formed as a dual-layer storage capacitor should further include a second interlayer insulation film at a layer under the third capacitor electrode but over the second capacitor electrode. It is preferable that an electro-optical device having the second storage capacitor in addition to the first storage capacitor should further include a second interlayer insulation film at a layer under the third capacitor electrode but over the second capacitor electrode.

In the preferred configuration of an electro-optical device according to the first aspect of the invention described above, the second interlayer insulation film is sandwiched between the second capacitor electrode and the third capacitor electrode. In addition, in the preferred configuration of an electro-optical device according to the first aspect of the invention described above, the second interlayer insulation film doubles as, that is, also functions as, the second dielectric film. Such a preferred configuration is advantageous in that it is not necessary to provide the second dielectric film in addition to the second interlayer insulation film because the second interlayer insulation film functions as the second dielectric film according to an aspect of the invention. Therefore, an electro-optical device having a preferred configuration described above makes it possible to achieve a simpler manufacturing process.

In the preferred configuration of an electro-optical device that further includes, either in the preferred dual-layer configuration or the preferred second-storage-capacitor configuration described above, a second interlayer insulation film at a layer under the third capacitor electrode but over the second capacitor electrode as described above, it is further preferable that the thickness of the second interlayer insulation film measured at an area where the second capacitor electrode and the third capacitor electrode are provided opposite to each other should be smaller in comparison with the thickness of the second interlayer insulation film measured at any other remaining area.

If so configured, it is possible to make the capacitance value of the first storage capacitor having a dual-layer structure between the first main portion of the second capacitor electrode and the third capacitor electrode relatively large. Or, if so configured, it is possible to make the capacitance value of the second storage capacitor between the second main portion of the second capacitor electrode and the third capacitor electrode relatively large. That is, such a preferred configuration is advantageous in that it is possible to make the accumulation/storage amount of electric charge larger than otherwise.

In the preferred configuration of an electro-optical device that further includes, either in the preferred dual-layer configuration or the preferred second-storage-capacitor configuration described above, a second interlayer insulation film at a layer under the third capacitor electrode but over the second capacitor electrode as described above, it is further preferable that the second interlayer insulation film should have a second opening at the area where the second capacitor electrode and the third capacitor electrode are provided opposite to each other; and the second opening should partially expose the surface of the second capacitor electrode.

If the preferred configuration of an electro-optical device according to the first aspect of the invention described above is adopted, in the above-described former preferred configuration according to which the first storage capacitor having a dual-layer structure is provided, the third capacitor electrode is provided opposite to the first main portion of the second capacitor electrode in the second opening with the second dielectric film being formed between the second capacitor electrode and the third capacitor electrode. On the other hand, if the preferred configuration of an electro-optical device according to the first aspect of the invention described above is adopted, in the above-described latter preferred configuration according to which the second storage capacitor is provided, the third capacitor electrode is provided opposite to the second main portion of the second capacitor electrode in the second opening with the second dielectric film being formed between the second capacitor electrode and the third capacitor electrode. In such a preferred configuration, if the thickness of the second dielectric film is formed to be relatively thin inside the second opening, it is possible to make the capacitance value of the first storage capacitor having a dual-layer structure between the first main portion of the second capacitor electrode and the third capacitor electrode relatively large; or, it is possible to make the capacitance value of the second storage capacitor between the second main portion of the second capacitor electrode and the third capacitor electrode relatively large. Such a preferred configuration is advantageous in that it is possible to store/accumulate a larger amount of electric charge thereat.

In the preferred dual-layer configuration of an electro-optical device described above according to which the first storage capacitor is formed as a dual-layer storage capacitor, or in the preferred second-storage-capacitor configuration of an electro-optical device described above that has the second storage capacitor in addition to the first storage capacitor, it is preferable that the third capacitor electrode should have a third main portion that is formed opposite to the second capacitor electrode and should further have a relay portion that extends from the third main portion so as to provide an electric connection between the pixel electrode and the pixel-electrode-side source/drain region.

Such a preferred configuration makes it unnecessary to provide the relay electrode in addition to the third capacitor electrode because the relay portion of the third capacitor electrode provides an electric connection between the pixel electrode and the pixel-electrode-side source/drain region. Therefore, it is possible to simplify the manufacturing process of an electro-optical device.

In the preferred dual-layer configuration of an electro-optical device described above according to which the first storage capacitor is formed as a dual-layer storage capacitor, or in the preferred second-storage-capacitor configuration of an electro-optical device described above that has the second storage capacitor in addition to the first storage capacitor, it is preferable that the third capacitor electrode should be formed at the same layer as that of the data line.

If such a preferred configuration is adopted, it is possible to form the third capacitor electrode and the data line by means of the same film. Therefore, it is possible to further simplify the manufacturing process of an electro-optical device.

In order to address the above-identified problem without any limitation thereto, the invention provides, as a second aspect thereof, an electronic apparatus that is provided with an electro-optical device according to the first aspect of the invention, which has any of the configurations described above, including its preferred or modified configurations.

According to an electronic apparatus of this aspect of the invention, it is possible to embody various kinds of electronic devices that are capable of providing a high-quality image display, including but not limited to, a projection-type display device, a mobile phone, an electronic personal organizer, a word processor, a viewfinder-type video tape recorder, a direct-monitor-view-type video tape recorder, a workstation, a videophone, a POS terminal, a touch-panel device, and so forth, because the electronic apparatus of this aspect of the invention is provided with the electro-optical device according to the above-described aspect of the invention.

These and other features, operations, and advantages of the present invention will be fully understood by referring to the following detailed description of exemplary embodiments in conjunction with the accompanying drawings.

BRIEF DESCRIPTION OF THE DRAWINGS

The invention will be described with reference to the accompanying drawings, wherein like numbers reference like elements.

FIG. 7 shows the layer/lamination structure of a pixel unit according to the second exemplary embodiment of the invention that corresponds to the layer/lamination structure of a pixel unit according to the first exemplary embodiment of the invention shown in FIG. 6.

FIG. 9 shows the layer/lamination structure of a pixel unit according to the modified second exemplary embodiment of the invention that corresponds to the layer/lamination structure of a pixel unit according to the first exemplary embodiment of the invention shown in FIG. 6.

FIG. 10 shows the layer/lamination structure of a pixel unit according to the third exemplary embodiment of the invention that corresponds to the layer/lamination structure of a pixel unit according to the first exemplary embodiment of the invention shown in FIG. 6.

DESCRIPTION OF EXEMPLARY EMBODIMENTS

With reference to the accompanying drawings, the configuration and operation of an electro-optical device according to an exemplary embodiment of the invention is explained below. In addition, the configuration and operation of an electronic apparatus that is provided with such an electro-optical device is also explained below. In the following explanation, a liquid crystal device that operates in a TFT active matrix drive scheme with a built-in driving circuit is taken as an example of an electro-optical device according to an exemplary embodiment of the invention.

First Embodiment

With reference to FIGS. 1-6, a liquid crystal device according to a first exemplary embodiment of the invention is explained below.

Figure 1:
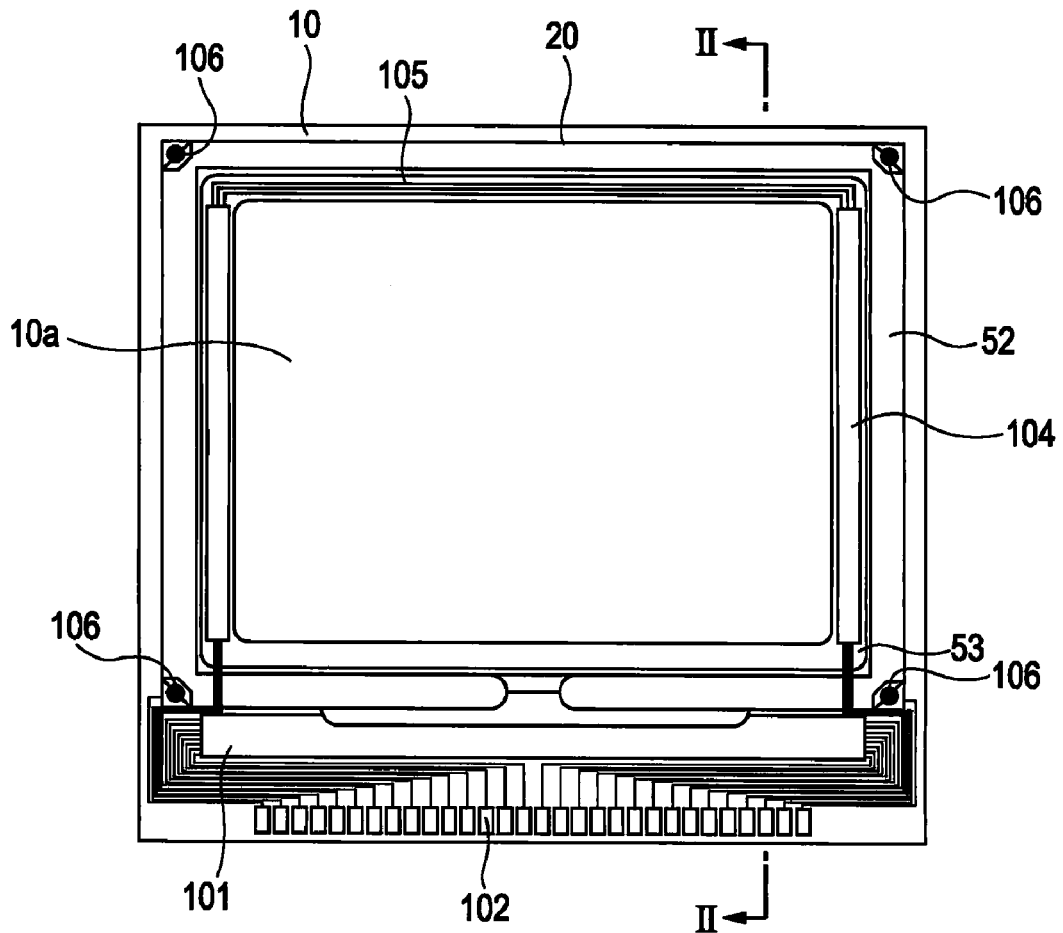
FIG. 1 is a plan view that schematically illustrates an example of the configuration of a liquid crystal device according to a first exemplary embodiment of the invention.
Figure 2:
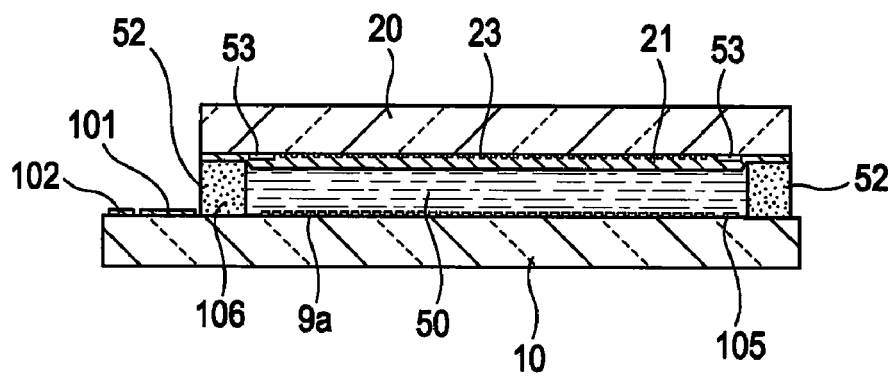
FIG. 2 is a sectional view taken along the line II-II of FIG. 1.

First of all, an example of the general configuration of a liquid crystal device according to the present embodiment of the invention is explained below while referring to FIGS. 1 and 2. FIG. 1 is a plan view that schematically illustrates an example of the configuration of a TFT array substrate and various components formed or deposited thereon, which are viewed from a certain point at the counter-substrate side, or from above the counter substrate. FIG. 2 is a sectional view taken along the line II-II of FIG. 1.

As shown in FIGS. 1 and 2, in the configuration of a liquid crystal device according to the present embodiment of the invention, a TFT array substrate 10 and a counter substrate 20 are arranged opposite to each other. The TFT array substrate 10 is a transparent substrate that is made of, for example, a quartz substrate, a glass substrate, a silicon substrate, and so forth. It is preferable that not only the TFT array substrate 10 but also the counter substrate 20 should be made of a transparent substrate. A liquid crystal layer 50 is sealed between the TFT array substrate 10 and the counter substrate 20. The TFT array substrate 10 and the counter substrate 20 are bonded to each other with the use of a sealant material 52 that is provided at a sealing region around an image display region 10a.

The sealant material 52 is made from, for example, an ultraviolet (UV) curable resin, a thermosetting resin, or the like, which functions to paste these substrates together. In the production process of the liquid crystal device according to the present embodiment of the invention, the sealant material 52 is applied onto the TFT array substrate 10 and subsequently hardened through an ultraviolet irradiation treatment, a heat treatment, or any other appropriate treatment. A gap material such as glass fibers, glass beads, or the like, are scattered in the sealant material 52 so as to set the distance (i.e., inter-substrate gap) between the TFT array substrate 10 and the counter substrate 20 at a predetermined gap value. A liquid crystal device according to the present embodiment of the invention is suitable for providing an enlarged display with a compact body, and especially preferable to be used as a light valve for a projector among many uses thereof.

Inside the sealing region at which the sealant material 52 is provided, and in parallel therewith, a picture frame light-shielding film 53, which has a light-shielding property and defines the picture frame region of the image display region 10a, is provided on the counter substrate 20. Notwithstanding the above, however, a part or a whole of the picture frame light-shielding film 53 may be provided at the TFT-array-substrate (10) side as a built-in light-shielding film.

A data line driving circuit 101 and external circuit connection terminals 102 are provided at a certain peripheral region outside the sealing region at which the sealant material 52 is provided in such a manner that these data line driving circuit 101 and external circuit connection terminals 102 are provided along one of four sides of the TFT array substrate 10. A pair of scanning line driving circuits 104 is provided along two of four sides thereof that are not in parallel with the above-mentioned one side in such a manner that each of the scanning line driving circuits 104 is enclosed by the picture frame light-shielding film 53. In addition to the above, a plurality of electric wirings 105 is provided along the remaining one side of the TFT array substrate 10 that is parallel with the first-mentioned one side thereof. The plurality of electric wirings 105 connects one of the pair of the scanning line driving circuits 104 to the other thereof. The picture frame light-shielding film 53 encloses these electric wirings 105. The pair of the scanning line driving circuits 104 is provided outside the image display region 10a in such a manner that each of these scanning line driving circuits 104 extends along the corresponding one of the second-mentioned two sides thereof.

Inter-substrate conductive material 106, which functions as conductive terminals that connect the upper substrate with the lower substrate, are provided at four corners of the counter substrate 20. On the other hand, another set of inter-substrate conductive terminals is provided on the TFT array substrate 10 at positions each of which is opposite to the corresponding one of the four conductive terminals 106 of the counter substrate 20. With such a structure, it is possible to establish electric conduction between the TFT array substrate 10 and the counter substrate 20.

In FIG. 2, a layered structure that includes laminations of TFTs for pixel switching, which are driver elements, and of wirings such scanning lines, data lines, and so on, is formed on the TFT array substrate 10. In the image display region 10a, pixel electrodes 9a are arranged in a matrix pattern at a layer above the lamination structure of the pixel-switching TFTs, the scanning lines, the data lines, and the like. An alignment (i.e., orientation) film is deposited on the pixel electrodes 9a. It should be noted that the alignment film is not illustrated in FIG. 2. On the other hand, a light-shielding film 23 is deposited on the surface of the counter substrate 20 opposite the TFT array substrate 10. The light-shielding film 23 is made of, for example, a metal film having light-shielding property. The light-shielding film 23 is formed in a grid pattern, though not limited thereto, in the image display region 10a on the counter substrate 20. The counter electrode 21, which is made of a transparent material such as indium tin oxide (ITO) or the like, is deposited on the light-shielding film 23 in a "solid" manner, that is, as a solid electrode, so as to cover the area in such a manner that the counter electrode is opposed to the plurality of pixel electrodes 9a. In the exemplary configuration of the liquid crystal device illustrated in FIG. 2, the counter electrode 21 is formed under the light-shielding film 23. Another alignment film is deposited on the counter electrode 21. In the exemplary configuration of the liquid crystal device illustrated in FIG. 2, the alignment film is formed under the counter electrode 21. This alignment film is also not illustrated in FIG. 2. The liquid crystal layer 50 is made of liquid crystal that consists of, for example, a mixture of one or more types of nematic liquid crystal element. Such a liquid crystal takes a predetermined orientation state between a pair of the above-mentioned orientation (i.e., alignment) films.

It should be noted that other functional circuits may also be provided on the TFT array substrate 10 illustrated in FIGS. 1 and 2 in addition to driving circuits such as the above-described data line driving circuit 101, the scanning line driving circuit 104, and the like, including but not limited to, a sampling circuit that performs the sampling of an image signal that flows on an image signal line so as to supply the sampled signal to a data line, a pre-charge circuit that supplies a pre-charge signal having a predetermined voltage level to each of the plurality of data lines prior to the supplying of an image signal, a test circuit for conducting an inspection on the quality, defects, etc., of the electro-optical device during the production process or before shipment, and the like.

Figure 3:
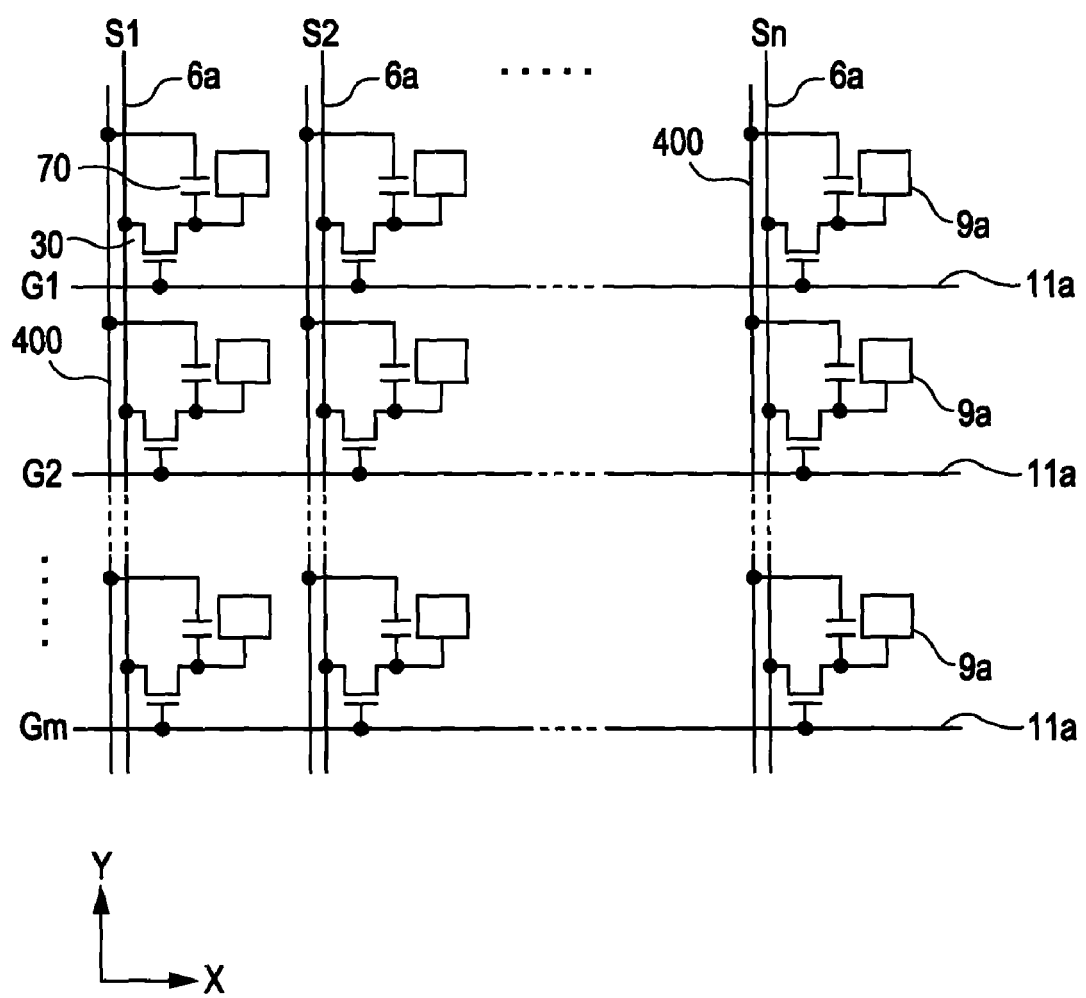
FIG. 3 is an equivalent circuit diagram that schematically illustrates an example of constituent elements and wirings in a plurality of pixels that are arranged in a matrix pattern so as to constitute the image display region of a liquid crystal device according to the first exemplary embodiment of the invention.

Next, the electric configuration of the pixel unit (i.e., pixel portion) of a liquid crystal device according to the present embodiment of the invention is explained below with reference to FIG. 3. FIG. 3 is an equivalent circuit diagram that schematically illustrates an example of constituent elements and wirings in a plurality of pixels that are arranged in a matrix pattern so as to constitute the image display region of a liquid crystal device according to the present embodiment of the invention.

As illustrated in FIG. 3, a TFT 30, which is an example of a "transistor" according to an aspect of the invention, as well as the pixel electrode 9a is provided in each of the plurality of pixels that are arranged in a matrix pattern so as to constitute the image display region 10a. The TFT 30 is electrically connected to the pixel electrode 9a so as to perform switching control on the pixel electrode 9a at the time of operation of the liquid crystal device. Each of data lines 6a to which image signals are supplied is electrically connected to the source of the TFT 30. Image signals $S1, S2, \ldots$, and $Sn$ that are written on the data lines 6a may be supplied respectively in this order in a line sequential manner. Alternatively, an image signal may be supplied to each of a plurality of groups thereof. Each group consists of a bundle of the data lines 6a arrayed adjacent to one another.

Each of scanning lines 11a is connected to the gate of the TFT 30. The liquid crystal device according to the present embodiment of the invention is configured to apply, at a predetermined timing and in a pulse pattern, scanning signals $G1, G2, \ldots$, and $Gm$ to the scanning lines 11a in this order in a line sequential manner. Each of the pixel electrodes 9a is electrically connected to the drain of the TFT 30. When the switch of the TFT 30, which functions as a switching element, is closed for a certain time period, the image signal $S1$, $S2, \ldots$, or $Sn$ that is supplied through the data line 6a is written at a predetermined timing. After being written into liquid crystal, which is an example of electro-optical material, via the pixel electrodes 9a, the image signals $S1$, $S2, \ldots$, and $Sn$ having a predetermined level are held for a certain time period between the pixel electrode 9a and the counter electrode formed on the counter substrate.

Since liquid crystal that constitutes the liquid crystal layer 50 (refer to FIG. 2) changes its orientation and/or order of molecular association depending on the level of a voltage being applied, it modulates light to realize gradation display. Under a "normally-white" mode, the optical transmittance, that is, light transmission factor, with respect to an incident light beam decreases in accordance with a voltage applied on a pixel-by-pixel basis (i.e., to each pixel), whereas, under a "normally-black" mode, the optical transmittance with respect to an incident light beam increases in accordance with a voltage applied on a pixel-by-pixel basis. Thus, when viewed as a whole, light having a certain contrast in accordance with an image signal is emitted from the liquid crystal device.

In order to prevent the leakage of the image signals being held, a storage capacitor 70 is added in parallel with a liquid crystal capacitor that is formed between the pixel electrode 9a and the counter electrode 21 (refer to FIG. 2). The storage capacitor 70 is a capacitive element that functions as a hold capacitor or a retention volume for temporally holding the electric potential of each of the pixel electrodes 9a in accordance with the supply of an image signal. One electrode of the storage capacitor 70 is connected to the drain of the TFT 30 in parallel connection with the pixel electrode 9a, whereas the other electrode thereof is connected to a capacitor line 400 with a fixed electric potential so as to provide a constant electric potential (i.e., potentiostatic). The storage capacitor 70 improves the electric potential retention property at the pixel electrode 9a. Therefore, it is possible to improve display characteristics, which could be perceived as an enhanced contrast and/or reduced flickers. As will be described later, the storage capacitor 70 functions also as a built-in light-shielding film that shuts off light entering toward the TFT 30.

Figure 4:
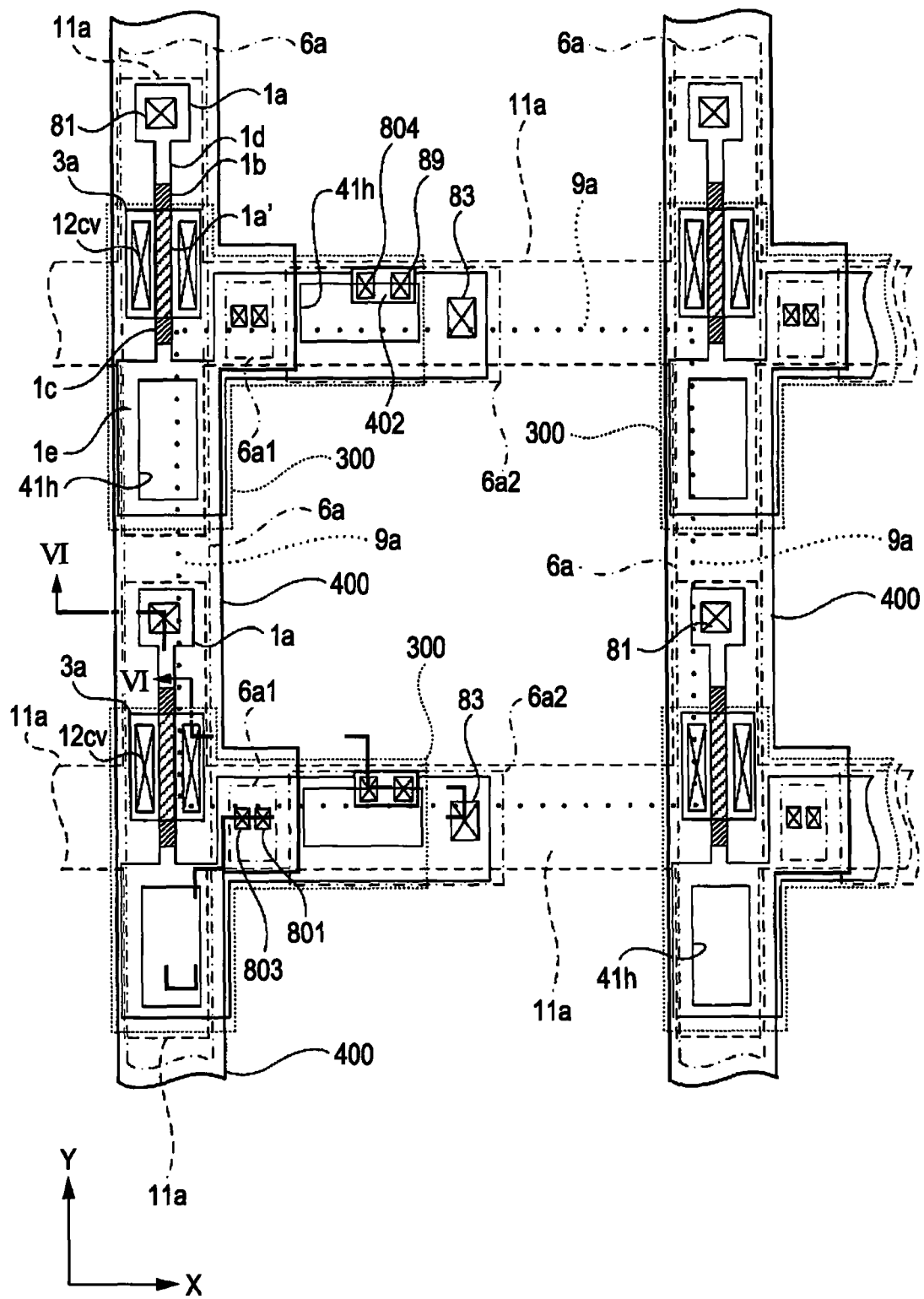
FIG. 4 is a plan view that schematically illustrates an example of the configuration of a plurality of pixel units that are arrayed adjacent to one another.
Figure 5:
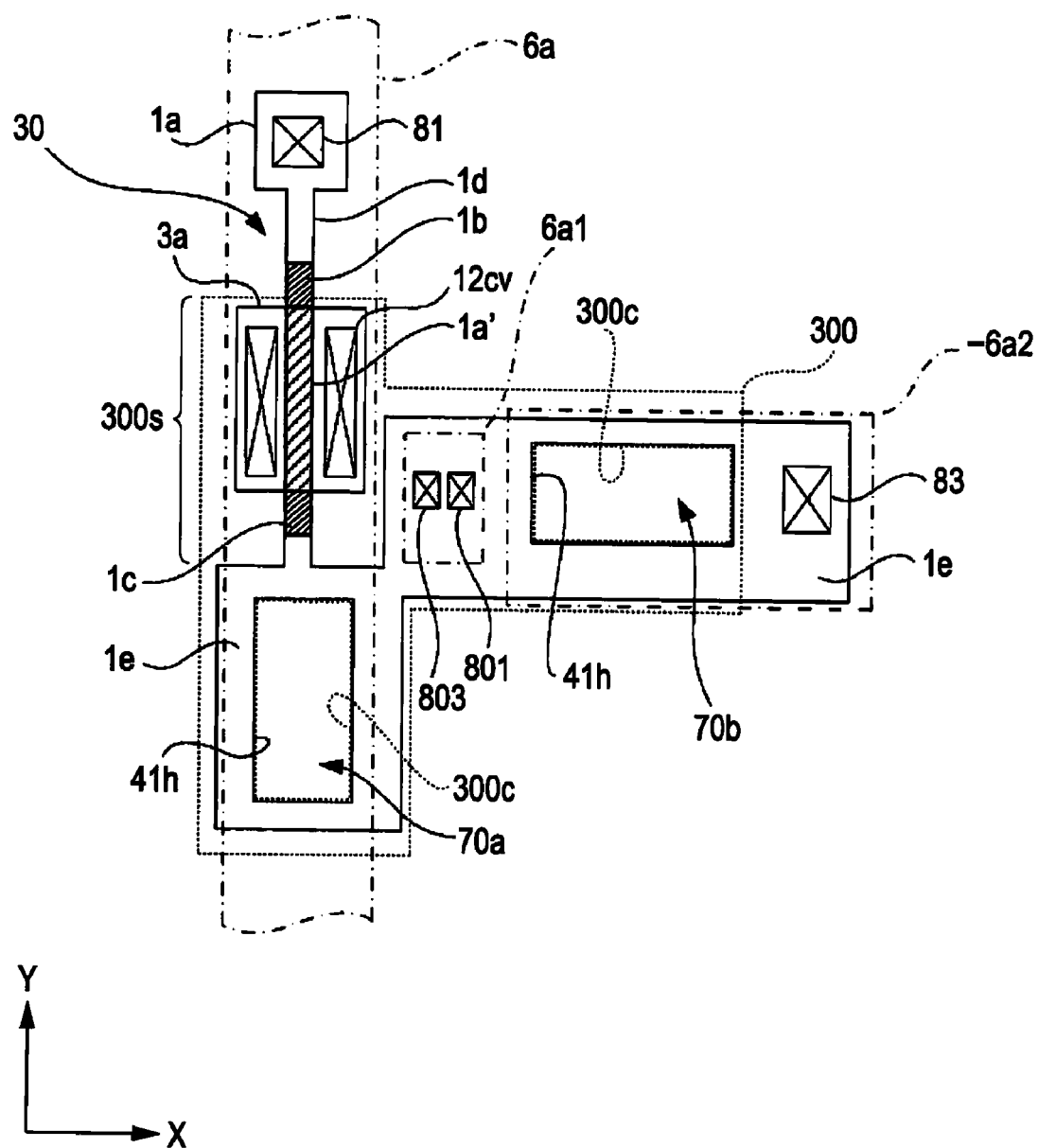
FIG. 5 is a partial plan view that schematically illustrates an example of the partial lamination structure of the pixel unit illustrated in FIG. 4 or FIG. 6, or more specifically, the second, the third, and the fourth layers thereof.
Figure 6:
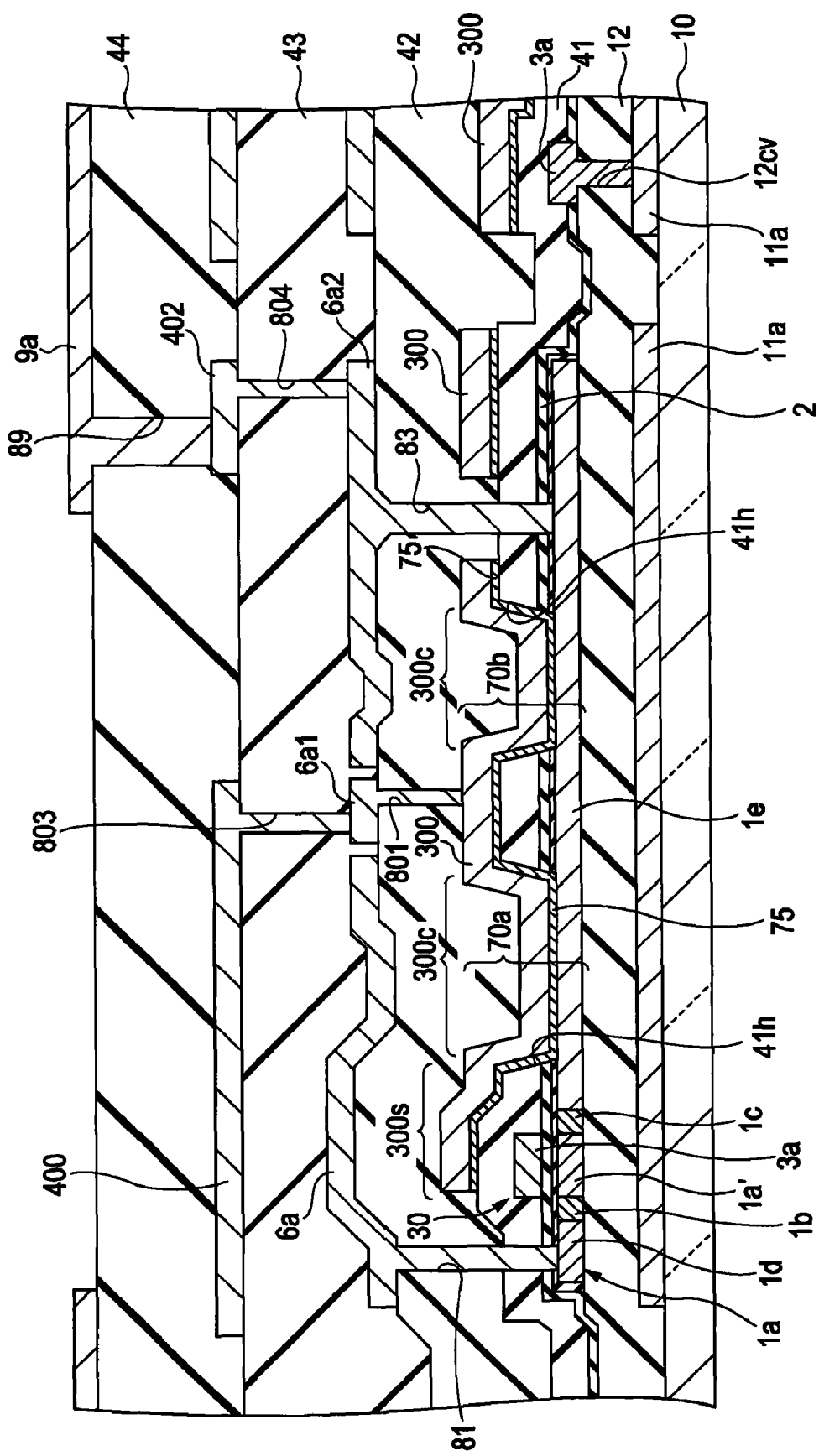
FIG. 6 is a sectional view taken along the line VI-VI of FIG. 4.

Next, with reference to FIGS. 4, 5, and 6, the specific configuration of the pixel portion (i.e., pixel unit) that realizes the operation described above is explained below. FIG. 4 is a plan view that schematically illustrates an example of the configuration of the plurality of pixel units that are arrayed adjacent to one another. FIG. 5 is a partial plan view that schematically illustrates an example of the partial lamination structure of the pixel unit illustrated in FIG. 4 or FIG. 6, or more specifically, the second, the third, and the fourth layers thereof. FIG. 6 is a sectional view taken along the line VI-VI of FIG. 4. In referring to FIGS. 4-6, it should be noted that different scales are used for layers/members so that each of the layers/members has a size that is easily recognizable in each of these drawings. The same holds true for each of other accompanying drawings that will be referred to later. For convenience of explanation, in FIGS. 4-6, layer portions above the pixel electrodes 9a are omitted from these drawings.

As illustrated in FIG. 4, the plurality of pixel electrodes 9a is arranged in a matrix pattern on the TFT array substrate 10. The data line 6a extends along a longitudinal boundary line between each two pixel electrodes 9a arrayed adjacent to each other. On the other hand, the scanning line 11a extends along a latitudinal boundary line between each two pixel electrodes 9a arrayed adjacent to each other. That is, each of the scanning lines 11a extends in the X direction, whereas each of the data lines 6a extends in the Y direction so as to intersect with the scanning lines 11a. At each intersection where the data line 6a and the scanning line 11a traverse, that is, intersect, each other, the pixel-switching TFT 30 is provided.

When viewed in two dimensions, the scanning line 11a, the data line 6a, the capacitor line 400, storage capacitors 70a and 70b (refer to FIG. 5), a relay layer 6a1, and TFT 30 are arranged inside the non-open region that surrounds the open region of each pixel corresponding to the pixel electrode 9a on the TFT array substrate 10. In the foregoing sentence, the term "open region" means an aperture area in each pixel which light that actually contributes to display is transmitted through or reflected by. In other words, the scanning line 11a, the data line 6a, the storage capacitors 70a and 70b, the relay layer 6a1, and the TFT 30 are arranged not in the open region of each pixel but in the non-open region thereof so as not to obstruct display.

In the following description, a detailed explanation is given of component layers that make up the lamination structure of the pixel units formed over the TFT array substrate 10. First of all, the layer structure of the undermost first layer is explained below.

As illustrated in FIG. 6, the scanning line 11a is formed in the first layer. The scanning line 11a is made of, for example, a conductive material having light-shielding property such as a high melting point metal material or the like. A couple of examples of such a high melting point metal material includes but not limited thereto tungsten (W), titanium (Ti), and titanium nitride (TiN). Notwithstanding the foregoing, however, the scanning line 11a may be made of an alloy that contains a high melting point metal material and silicon. Or, alternatively, the scanning line 11a may be made of a bi-layer film that has a lamination structure made up of a high melting point metal material and silicon or a multi-layer film that has a lamination structure made up of at least a high melting point metal material and silicon.

As illustrated in FIG. 4, in addition to the main line portion that extends in the X direction, the scanning line 11a has a non-main-line extending portion that extends in the Y direction from the X-directional main line portion so as to overlap the channel region 1a' of the TFT 30. It is preferable that the scanning line 11a should be formed in such a manner that it includes a region opposite to the channel region 1a', the data-line-side LDD region 1b, the pixel-electrode-side LDD region 1c, the data-line-side source/drain region 1d, and the pixel-electrode-side source/drain region 1e of the TFT 30. Thus, thanks to the presence of the scanning line 11a, it is possible to almost or completely shut off a return light, including but not limited to, light attributable to backside reflection at the TFT array substrate 10, light that is emitted from other liquid crystal device such as a multiple-plate type projector, etc., to penetrate through a composite optical system, and so on, thereby effectively protecting the channel region 1a' of the TFT 30. That is, the scanning line 11a functions not only as wiring for supplying a scanning signal but also as a light-shielding film of the TFT 30, which is provided to shut a return light off.

As illustrated in FIG. 6, the scanning line 11a is formed at the first layer, whereas the TFT 30 is formed at the second layer. As shown therein, an underlying insulation film 12, or, in other words, ground insulator film 12, is interposed between the first-layer scanning line 11a and the second-layer TFT 30. The underlying insulation film 12 has a function of insulating the TFT 30 from the scanning line 11a. In addition thereto, the underlying insulation film 12 that is formed over the entire surface of the TFT array substrate 10 has a function of preventing any degradation in the characteristics and/or performance of the pixel-switching TFT 30 that is attributable to the surface roughness of the TFT array substrate 10 caused at the time of surface polishing thereof or attributable to any stains that remain without being removed completely after washing thereof, though not limited thereto.

As shown in FIG. 6, the TFT 30 that is formed on the second layer has a semiconductor film 1a and a gate electrode 3a. In the following description, the semiconductor film 1a may be referred to as semiconductor layer 1a.

The semiconductor layer 1a is made of, for example, poly-silicon. As illustrated in FIGS. 4 and 5, the semiconductor layer 1a consists of the channel region 1a', the data-line-side LDD region 1b, the pixel-electrode-side LDD region 1c, the data-line-side source/drain region 1d, and the pixel-electrode-side source/drain region 1e. The channel region 1a' has a channel length along the Y direction. That is, the TFT 30 has an LDD structure. It should be noted that the data-line-side LDD region 1b is an example of "a first junction region" according to an aspect of the invention, whereas the pixel-electrode-side LDD region 1c is an example of "a second junction region" according to an aspect of the invention.

The data-line-side source/drain region 1d and the pixel-electrode-side source/drain region 1e are formed approximately in a mirror symmetry along the Y direction with respect to the channel region 1a'. The data-line-side LDD region 1b is formed between the channel region 1a' and the data-line-side source/drain region 1d. The pixel-electrode-side LDD region 1c is formed between the channel region 1a' and the pixel-electrode-side source/drain region 1e. The data-line-side LDD region 1b, the pixel-electrode-side LDD region 1c, the data-line-side source/drain region 1d, and the pixel-electrode-side source/drain region 1e are impurity regions that are formed by implanting impurities into the semiconductor layer 1a by using, for example, an ion implantation method, or other alternative method. The data-line-side LDD region 1b and the pixel-electrode-side LDD region 1c are deposited as lightly doped (low concentration) impurity regions having less impurities than the data-line-side source/drain region 1d and the pixel-electrode-side source/drain region 1e, respectively. According to such an impurity region, it is possible to reduce the amount of an OFF-state current that flows in the source region and the drain region during the non-operating time of the TFT 30, and also to suppress the decrease of an ON-state current that flows during the operating time of the TFT 30. It should be noted that, although it is preferable that the TFT 30 has an LDD structure, it might be configured to have an offset structure in which the implantation of impurities is not performed on the data-line-side LDD region 1b and the pixel-electrode-side LDD region 1c. As another alternative example, it may be configured that impurities are heavily doped while using the gate electrode as a mask (i.e., high concentration) so as to deposit the data-line-side source/drain region and the pixel-electrode-side source/drain region, which may be referred to as a self-aligned structure.

As illustrated in FIGS. 4 and 5, the pixel-electrode-side source/drain region 1e of the semiconductor layer 1a has one portion that extends in the Y direction and another portion that extends in the X direction from the above-mentioned Y-directional extending portion. As will be described later, the X-directional extending portion of the pixel-electrode-side source/drain region 1e of the semiconductor layer 1a is electrically connected to a relay electrode 6a2 through a contact hole 83.

As illustrated in FIG. 6, a gate insulation film 2 is deposited between the gate electrode 3a and the semiconductor layer 1a. With such a configuration, the gate electrode 3a and the semiconductor layer 1a are insulated from each other with the gate insulation film 2 being interposed therebetween. As illustrated in FIGS. 4 and 5, the gate electrode 3a has a long side along the Y direction. The gate electrode 3a overlies the channel region 1a' of the semiconductor layer 1a. A contact hole 12cv is formed at a position adjacent to each of one side of the channel region 1a' and the other side thereof. Accordingly, one contact hole 12cv, the channel region 1a', and the other contact hole 12cv are arrayed adjacent to each other as viewed in two dimensions along the X direction. Each of these contact holes 12cv is formed as a groove-like hole that is elongated in the direction of the channel length. As illustrated in FIG. 6, the gate electrode 3a is electrically connected to the scanning line 11a through the contact hole 12cv.

As illustrated in FIG. 6, an inter-bedded insulation film 41 is formed at a layer over the TFT 30. The inter-bedded insulation film 41 provides insulation between the second layer and the third layer. The inter-bedded insulation film 41 is a non-limiting example of "a first interlayer insulation film" according to an aspect of the invention. As illustrated in FIGS. 4, 5, and 6, the inter-bedded insulation film 41 has a pair of first open areas 41h, which is a non-limiting example of "a first opening" according to an aspect of the invention. Each of these first open areas 41h partially exposes the surface of the pixel-electrode-side source/drain region 1e of the semiconductor layer 1a.

More specifically, these first open areas 41h expose the surface of the pixel-electrode-side source/drain region 1e of the semiconductor layer 1a at two places toward upper layers. As illustrated in FIG. 5, one of these two exposure places is formed on the above-mentioned X-directional extending portion of the pixel-electrode-side source/drain region 1e of the semiconductor layer 1a, whereas the other of these two exposure places is formed on the above-mentioned Y-directional extending portion of the pixel-electrode-side source/drain region 1e thereof. In the following description, the pair of first open areas 41h may be collectively referred to as first open area 41h or first opening 41h.

As illustrated in FIG. 6, an upper capacitor electrode 300 is formed at the third layer, which is over the inter-bedded insulation film 41. The upper capacitor electrode 300 functions as a capacitor electrode that is common to the storage capacitors 70a and 70b. The storage capacitors 70a and 70b are a non-limiting example of "a first storage capacitor" according to an aspect of the invention. The upper capacitor electrode 300 is a non-limiting example of "a second capacitor electrode" according to an aspect of the invention.

The upper capacitor electrode 300 has a first main capacitor electrode portion 300c and an extending portion 300s. As illustrated in FIGS. 5 and 6, the first main capacitor electrode portion 300c of the upper capacitor electrode 300 is formed inside the first open area 41h. The extending portion 300s of the upper capacitor electrode 300 extends from the first main capacitor electrode portion 300c thereof. The extending portion 300s of the upper capacitor electrode 300 at least partially covers the pixel-electrode-side LDD region 1c of the semiconductor layer 1a.

As illustrated in FIG. 5, the upper capacitor electrode 300 has one portion that extends in the Y direction and another portion that extends in the X direction from the above-mentioned Y-directional extending portion. The above-mentioned Y-directional extending portion of the upper capacitor electrode 300 overlaps (e.g., overlies) the channel region 1a', the pixel-electrode-side LDD region 1c, and the aforementioned Y-directional extending portion of the pixel-electrode-side source/drain region 1e of the semiconductor layer 1a. On the other hand, the above-mentioned X-directional extending portion of the upper capacitor electrode 300 overlaps the aforementioned X-directional extending portion of the pixel-electrode-side source/drain region 1e of the semiconductor layer 1a. As illustrated in FIGS. 5 and 6, the first main capacitor electrode portion 300c of the upper capacitor electrode 300 is formed inside the first open area 41h in each of the X-directional extending portion thereof and the Y-directional extending portion thereof in such a manner that the first main capacitor electrode portion 300c of the upper capacitor electrode 300 is provided opposite to the pixel-electrode-side source/drain region 1e with some interlayer being interposed therebetween. Therefore, as clearly shown in FIG. 6, the storage capacitor 70a is formed at one of the aforementioned two exposure places inside the first open area 41h, whereas the storage capacitor 70b is formed at the other of the aforementioned two exposure places inside the first open area 41h. Each of the storage capacitors 70a and 70b has a planar structure.

That is, a part of the pixel-electrode-side source/drain region 1e of the semiconductor layer 1a functions as a lower capacitor electrode. It should be noted that a part of the pixel-electrode-side source/drain region 1e of the semiconductor layer 1a is a non-limiting example of "a first capacitor electrode" according to an aspect of the invention. As shown in FIGS. 4, 5, and 6, the pixel-electrode-side source/drain region 1e of the semiconductor layer 1a is electrically connected to the relay electrode 6a2 via the contact hole 83. The relay electrode 6a2 is electrically connected to a relay layer 402 via a contact hole 804. The relay layer 402 is deposited at the fifth layer. The relay layer 402 is electrically connected to the pixel electrode 9a via a contact hole 89. Since a part of the pixel-electrode-side source/drain region 1e of the semiconductor layer 1a functions as a lower capacitor electrode, the electric potential of the lower capacitor electrode is kept at a pixel electric potential. Thus, the part of the pixel-electrode-side source/drain region 1e of the semiconductor layer 1a, that is, the lower capacitor electrode, operates as a pixel-electric-potential-side capacitor electrode.

On the other hand, as illustrated in FIGS. 4, 5, and 6, the upper capacitor electrode 300 is electrically connected to the aforementioned relay layer 6a1 via a contact hole 801. The relay layer 6a1 is formed at the fourth layer. The relay layer 6a1 is electrically connected to the aforementioned capacitor line 400 via a contact hole 803. The capacitor line 400 is formed at the fifth layer. The capacitor line 400 extends, for example, from the image display region 10a, at which the pixel electrodes 9a are provided, to the periphery thereof. It should be noted that the detailed line configuration thereof is not illustrated in the accompanying drawings. The upper capacitor electrode 300 is electrically connected to a constant potential source via the capacitor line 400. With such an electric connection, the electric potential of the upper capacitor electrode 300 is maintained at a constant potential. Therefore, the first main capacitor electrode portion 300c of the upper capacitor electrode 300 functions as a constant-potential-side capacitor electrode.

A dielectric film 75 is deposited between the semiconductor layer 1a and the upper capacitor electrode 300. More specifically, the dielectric film 75 is sandwiched between, inside the first open area 41h, the above-mentioned part of the pixel-electrode-side source/drain region 1e of the semiconductor layer 1a and the first main capacitor electrode portion 300c of the upper capacitor electrode 300. The dielectric film 75 is an example of "a first dielectric film" according to an aspect of the invention, though not limited thereto. The dielectric film 75 has a monolithic structure or multi-tiered structure made of a silicon oxide film including but not limited to an HTO (High Temperature Oxide) film, an LTO (Low Temperature Oxide) film, or of a silicon nitride film, and the like.

As illustrated in FIG. 5, the extending portion 300s of the upper capacitor electrode 300 is formed as a part of the aforementioned Y-directional extending portion thereof. As illustrated in FIGS. 5 and 6, the extending portion 300s of the upper capacitor electrode 300 covers the channel region 1a' of the semiconductor layer 1a and the pixel-electrode-side LDD region 1c thereof. It is preferable that at least the extending portion 300s of the upper capacitor electrode 300 should be made of a light-shielding material having light-shielding property.

In the configuration of a liquid crystal device according to the present embodiment of the invention, as has already been described above, the storage capacitors 70a and 70b are formed at two places in the non-open region of each pixel. Such a configuration is advantageous in that it is possible to accumulate/store a relatively large amount of electric charge thereat. In addition, if the thickness of the dielectric film 75 is formed to be relatively thin inside the first open area 41h, it is possible to make the capacitance value of each of the storage capacitors 70a and 70b relatively large. As a result thereof, it is possible to make the amount of electric charge that is accumulated/stored at each of the storage capacitors 70a and 70b relatively large.

As illustrated in FIG. 6, an inter-bedded insulation film 42 is formed at a layer over the upper capacitor electrode 300. The inter-bedded insulation film 42 provides insulation between the third layer and the fourth layer. The contact hole 801 penetrates through the inter-bedded insulation film 42 to reach the surface of the upper capacitor electrode 300. Accordingly, the open bottom of the contact hole 801 partially exposes the surface of the upper capacitor electrode 300. The contact hole 81 penetrates through both the inter-bedded insulation films 42 and 41 and further through the gate insulation film 2 to reach the surface of the semiconductor layer 1a. Accordingly, the open bottom of the contact hole 81 partially exposes the surface of the semiconductor layer 1a. In like manner, the contact hole 83 penetrates through both the inter-bedded insulation films 42 and 41 and further through the gate insulation film 2 to reach the surface of the semiconductor layer 1a. Accordingly, the open bottom of the contact hole 83 partially exposes the surface of the semiconductor layer 1a.

As illustrated in FIGS. 4, 5, and 6, the data line 6a, the relay layer 6a1, and the relay electrode 6a2 are formed on the fourth layer.

As illustrated in FIG. 6, the data line 6a is electrically connected to the data-line-side source/drain region 1d of the semiconductor layer 1a via the contact hole 81. The relay electrode 6a2 is electrically connected to the pixel-electrode-side source/drain region 1e of the semiconductor layer 1a via the contact hole 83. The relay layer 6a1 is electrically connected to the upper capacitor electrode 300 via the contact hole 801.

As illustrated in FIGS. 4 and 5, the relay layer 6a1 and the relay electrode 6a2 are arrayed in the order of appearance herein as viewed from the data line 6a, which extends in the Y direction, in two dimensions along the forward X direction. Each of the relay layer 6a1 and the relay electrode 6a2 is arrayed so as to overlap the semiconductor layer 1a. The data line 6a, the relay layer 6a1, and the relay electrode 6a2 are formed by, firstly, depositing a thin film that is made of a conductive material such as a metal film on the inter-bedded insulation film 42 by means of a thin film deposition technique, and then by partially removing the thin film (i.e., patterning) so as to separate the data line 6a, the relay layer 6a1, and the relay electrode 6a2 from one another. Therefore, the manufacturing process of a liquid crystal device according to the present embodiment of the invention is simplified because the data line 6a, the relay layer 6a1, and the relay electrode 6a2 can be formed in the same single production step.

As illustrated in FIG. 6, an inter-bedded insulation film 43 is formed at a layer over the data line 6a, the relay layer 6a1, and the relay electrode 6a2. The inter-bedded insulation film 43 provides insulation between the fourth layer and the fifth layer. The contact hole 803 penetrates through the inter-bedded insulation film 43 to reach the surface of the relay layer 6a1. Accordingly, the open bottom of the contact hole 803 partially exposes the surface of the relay layer 6a1. On the other hand, the contact hole 804 penetrates through the inter-bedded insulation film 43 to reach the surface of the relay electrode 6a2. Accordingly, the open bottom of the contact hole 804 partially exposes the surface of the relay electrode 6a2.

As illustrated in FIG. 6, the capacitor line 400 and the relay layer 402 are formed in the fifth layer.

As illustrated in FIG. 4, the capacitor line 400 is formed in such a manner that it extends along a direction in which the data line 6a extends, that is, along the Y direction. Each of the data line 6a and the capacitor line 400 is wired at a region opposite to the channel region 1a', the data-line-side LDD region 1b, the pixel-electrode-side LDD region 1c, the data-line-side source/drain region 1d, and the pixel-electrode-side source/drain region 1e of the semiconductor layer 1a. Such a wiring pattern of the data line 6a and the capacitor line 400 makes it possible to shut off any incident light beam entering from the upper-layer side toward any of these regions.

In FIG. 6, it is preferable that the relay layer 402 should be made of the same film as that of the capacitor line 400. As has already been explained above, the relay layer 402 is electrically connected to the pixel electrode 9a. In addition, the relay layer 402 is electrically connected to the relay electrode 6a2. Accordingly, the relay layer 402 electrically connects the pixel electrode 9a and the relay electrode 6a2 to each other.

As illustrated in FIG. 6, an inter-bedded insulation film 44 is formed at a layer over the capacitor line 400 and the relay layer 402. The inter-bedded insulation film 44 provides insulation between the fifth layer and the sixth layer. The contact hole 89 penetrates through the inter-bedded insulation film 44 to reach the surface of the relay layer 402. Accordingly, the open bottom of the contact hole 89 partially exposes the surface of the relay layer 402.

As illustrated in FIGS. 4 and 6, the pixel electrode 9a is formed in the sixth layer.

As illustrated in FIG. 6, the pixel electrode 9a is electrically connected to the relay layer 402 through the contact hole 89 and further relay-connected from the relay layer 402 to the relay electrode 6a2 through the contact hole 804. The relay electrode 6a2 is electrically connected to the pixel-electrode-side source/drain region 1e of the semiconductor layer 1a through the contact hole 83. Therefore, the pixel electrode 9a is indirectly connected to the pixel-electrode-side source/drain region 1e of the semiconductor layer 1a through the electrical relay structure provided therebetween. As has already been explained above while making reference to FIG. 2, an alignment film that is subjected to a predetermined orientation processing such as rubbing processing or the like is provided on the upper surface of the pixel electrodes 9a.

The structure described above is common to each of the pixel units as illustrated in FIG. 4. In the image display region 10a that is illustrated in FIG. 1, the pixel units are provided in a cyclic pattern.

In the configuration of a liquid crystal device according to the present embodiment of the invention, as has already been explained above while making reference to FIG. 6, the upper capacitor electrode 300 is formed at the third layer. On the other hand, as has also already been explained above, the TFT 30 is formed at the second layer that is separated from the third layer at which the upper capacitor electrode 300 is formed. Therefore, the upper capacitor electrode 300 is formed over/above the gate electrode 3a. For this reason, in comparison with a planar structure of the related art that has already been explained earlier, if the configuration of a liquid crystal device according to the present embodiment of the invention is adopted, it is unlikely that any short-circuit failure occurs between the upper capacitor electrode 300 and the gate electrode 3a even if the upper capacitor electrode 300 and the gate electrode 3a are arrayed in close proximity to each other when viewed in two dimensions. Thus, the configuration of a liquid crystal device according to the present embodiment of the invention makes it possible to reduce, in the two-dimensional layout of a pixel, restrictions based on the relative array positions of the first main capacitor electrode portion 300c of the upper capacitor electrode 300 and the gate electrode 3a, thereby making it further possible to easily adjust the layout area of a non-open region. As a result thereof, it is possible to heighten/increase numerical aperture, that is, opening ratio by making the area size of the non-open region smaller and thereby making the area size of the open region larger.

According to the empirical study conducted by the inventor of the subject application (i.e., present invention), it is found that, at the time of the operation of the TFT 30 having an LDD structure, there is a relatively greater possibility of the occurrence of an optical leakage current in the pixel-electrode-side LDD region 1c than in the data-line-side LDD region 1b as any incident light beam propagates toward the semiconductor layer 1a. In the configuration of a liquid crystal device according to the present embodiment of the invention, as shown in FIG. 5, the extending portion 300s of the upper capacitor electrode 300 at least partially overlaps the pixel-electrode-side LDD region 1c of the semiconductor layer 1a. By this means, it is possible to shut off any incident light beam entering from the upper-layer side toward the pixel-electrode-side LDD region 1c of the semiconductor layer 1a. Therefore, it is possible to improve the light-shielding performance of the non-open region for protection of the TFT 30, thereby preventing the occurrence of any optical leakage current in a more reliable manner. As a result thereof, it is possible to avoid any display failure from occurring due to the malfunction of the TFT 30 and/or flickers, though not limited thereto. Thus, a liquid crystal device according to the present embodiment of the invention features enhanced display quality.

Moreover, since the storage capacitor 70a or 70b has a planar structure, in comparison with the configuration of a storage capacitor of the related art that is disclosed in the aforementioned unexamined Japanese patent application publication of JP-A-2005-45017 or the aforementioned Japanese patent gazette 3,141,860, a liquid crystal device according to the present embodiment of the invention makes it possible to achieve a simpler manufacturing process.

Although an exemplary embodiment of the present invention is described above, needless to say, the invention is in no case restricted to the specific embodiment described herein; the invention may be configured in an adaptable manner in a variety of variations and/or modifications without departing from the spirit thereof. A non-limiting variation example thereof is explained below. In the configuration of the storage capacitor 70a or 70b shown in FIG. 6, it is explained that the dielectric film 75 is used as an example of "a first dielectric film" according to an aspect of the invention. Notwithstanding the foregoing, however, the gate insulation film 2 may be used as an example of the first dielectric film according to an aspect of the invention. In such a modified configuration, the first open area 41h of the inter-bedded insulation film 41 exposes the surface of the gate insulation film 2. Such a configuration makes it unnecessary to provide the dielectric film 75 in addition to the gate insulation film 2 as explained in the foregoing first embodiment of the invention while making reference to FIG. 6 because a part of the gate insulation film 2 functions as the first dielectric film according to an aspect of the invention in the first open area 41h in place of the dielectric film 75. Therefore, it is possible to simplify the manufacturing process of an electro-optical device.

Second Embodiment

Next, with reference to FIGS. 7 and 8, a liquid crystal device according to a second exemplary embodiment of the invention is explained below.

The layer/lamination structure of each pixel of a liquid crystal device according to the second embodiment of the invention differs from the layer/lamination structure of each pixel of a liquid crystal device according to the foregoing first embodiment of the invention in that the former has a dual-layer storage capacitor. The storage capacitor having a dual-layer structure according to the second embodiment of the invention is made up of the second-layer semiconductor film (i.e., semiconductor layer), the third-layer upper capacitor electrode, and the fourth-layer relay electrode. In the following description of a liquid crystal device according to the second embodiment of the invention, differences in the layer/lamination structure thereof from that of the liquid crystal device according to the first embodiment of the invention described above are mainly explained while making reference to FIGS. 7 and 8 as well as the above-referenced FIGS. 1-6. Therefore, in the following description of the liquid crystal device according to the second embodiment of the invention, the same reference numerals are consistently used for the same components as those of the liquid crystal device according to the first embodiment of the invention so as to omit, if appropriate, any redundant explanation or simplify explanation thereof.

Figure 7:
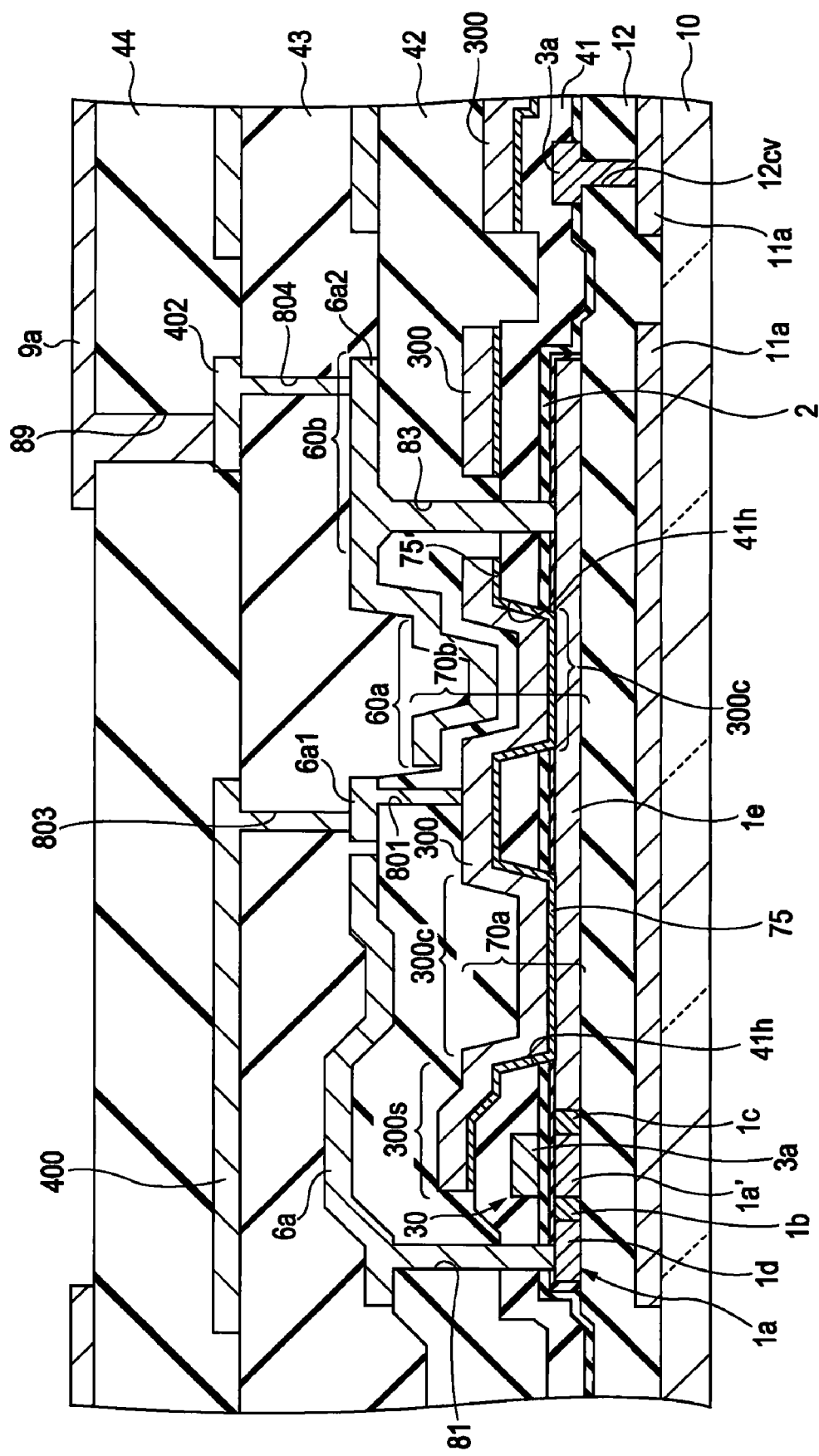
FIG. 7 is a sectional view that schematically illustrates an example of the configuration of a pixel unit according to a second exemplary embodiment of the invention; or, more specifically.
Figure 8:
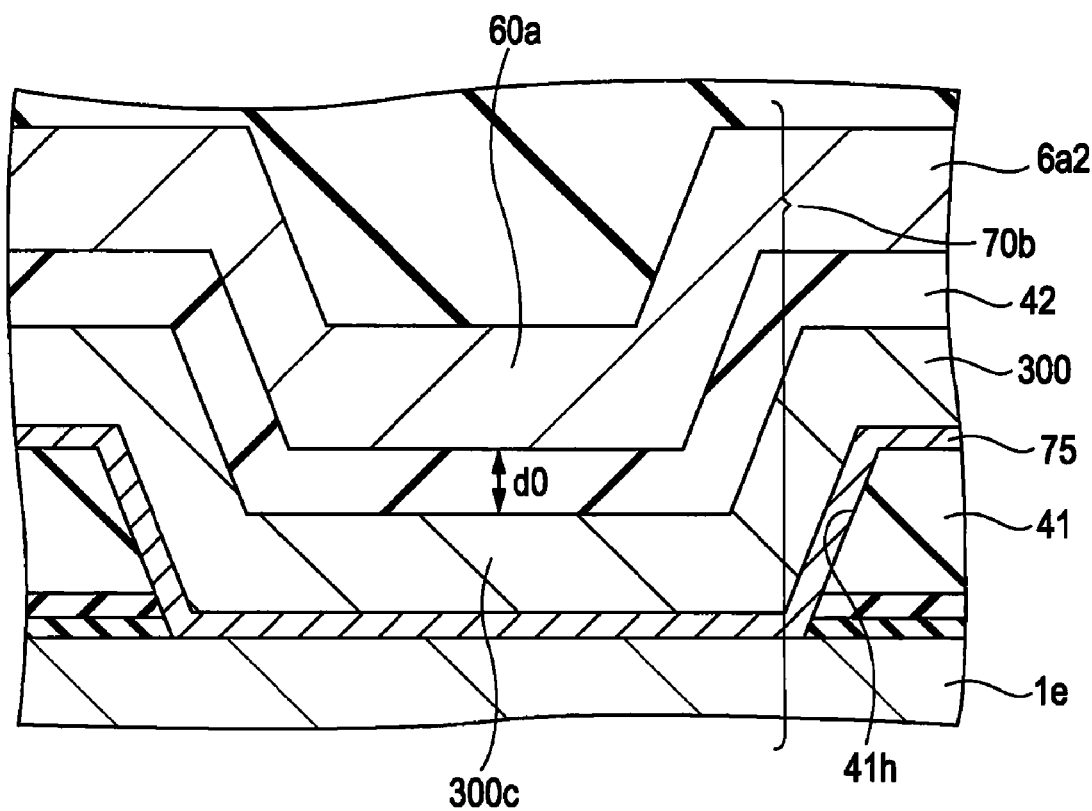
FIG. 8 is a partially enlarged sectional view that schematically illustrates an example of the layer/lamination structure of a storage capacitor 70b shown in FIG. 7.

FIG. 7 is a sectional view that schematically illustrates an example of the configuration of a pixel unit according to the second exemplary embodiment of the invention. It should be noted that FIG. 7 shows the layer/lamination structure of a pixel unit according to the second exemplary embodiment of the invention that corresponds to the layer/lamination structure of a pixel unit according to the first exemplary embodiment of the invention shown in FIG. 6. FIG. 8 is a partially enlarged sectional view that schematically illustrates an example of the layer/lamination structure of the storage capacitor 70b shown in FIG. 7.

As illustrated in FIG. 7, in the layer/lamination structure of a liquid crystal device according to the present embodiment of the invention, the relay electrode 6a2 formed at the fourth layer has a third main (capacitor electrode) portion 60a and a relay portion 60b. The third main portion 60a of the relay electrode 6a2 is provided opposite to the first main capacitor electrode portion 300c of the upper capacitor electrode 300. The third main portion 60a of the relay electrode 6a2 and the first main capacitor electrode portion 300c of the upper capacitor electrode 300 together with an inter-bedded layer that is interposed therebetween make up a storage capacitor. The relay portion 60b of the relay electrode 6a2 extends from the third main portion 60a thereof. The relay portion 60b of the relay electrode 6a2 is electrically connected to the pixel-electrode-side source/drain region 1e of the semiconductor layer 1a through the contact hole 83. The relay electrode 6a2 formed at the fourth layer is a non-limiting example of "a third capacitor electrode" according to an aspect of the invention. As has already been explained earlier, a combination of the relay layer 402 and the relay portion 60b of the relay electrode 6a2 provides electric connection between the pixel-electrode-side source/drain region 1e of the semiconductor layer 1a and the pixel electrode 9a.

Referring back to FIG. 5, a region of the relay electrode 6a2 that overlaps, in a plan view, the first main capacitor electrode portion 300c of the upper capacitor electrode 300, which is formed inside the first open area 41h, is formed as the third main portion 60a thereof. As illustrated in FIG. 7, the third main portion 60a of the relay electrode 6a2 is provided opposite to the first main capacitor electrode portion 300c of the upper capacitor electrode 300. A part of the inter-bedded insulation film 42 that is sandwiched between the first main capacitor electrode portion 300c of the upper capacitor electrode 300 and the third main portion 60a of the relay electrode 6a2 functions as a non-limiting example of "a second dielectric film" according to an aspect of the invention. In the configuration of a liquid crystal device according to the present embodiment of the invention, the inter-bedded insulation film 42 is formed as a non-limiting example of "a second interlayer insulation film" according to an aspect of the invention. Accordingly, in the layer/lamination structure of a liquid crystal device according to the present embodiment of the invention, the first main capacitor electrode portion 300c of the upper capacitor electrode 300 is sandwiched between the aforementioned part of the pixel-electrode-side source/drain region 1e of the semiconductor layer 1a, which is formed at the lower-layer-side thereof, and the third main portion 60a of the relay electrode 6a2, which is formed at the upper-layer-side thereof. A part of the dielectric film 75 is formed between the aforementioned part of the pixel-electrode-side source/drain region 1e of the semiconductor layer 1a and the first main capacitor electrode portion 300c of the upper capacitor electrode 300. The above-mentioned part of the inter-bedded insulation film 42 is formed between the first main capacitor electrode portion 300c of the upper capacitor electrode 300 and the third main portion 60a of the relay electrode 6a2.

Therefore, in the configuration of a liquid crystal device according to the second embodiment of the invention described herein, it is possible to form the storage capacitor 70b, which are formed inside the X-directional extending portion of the upper capacitor electrode 300, or, in other words, the X-directional extending portion of the pixel-electrode-side source/drain region 1e of the semiconductor layer 1a as shown in the plan view of FIG. 5, as a dual-layer storage capacitor whereas the storage capacitor 70a, which are formed inside the Y-directional extending portion of the upper capacitor electrode 300, or, in other words, the Y-directional extending portion of the pixel-electrode-side source/drain region 1e of the semiconductor layer 1a as shown in the plan view of FIG. 5, has a foregoing non-dual-layer structure. Therefore, in comparison with the configuration of a liquid crystal device according to the foregoing first exemplary embodiment of the invention, a liquid crystal device according to the second exemplary embodiment of the invention described herein makes it possible to accumulate (i.e., store) a larger amount of electric charge at the dual-layer storage capacitor 70b.

It is preferable that the thickness of the above-described part of the inter-bedded insulation film 42 that is sandwiched between the first main capacitor electrode portion 300c of the upper capacitor electrode 300 and the third main portion 60a of the relay electrode 6a2 should be relatively small in comparison with that of other remaining part of the inter-bedded insulation film 42. In FIG. 8, the thickness of the above-described part of the inter-bedded insulation film 42 that is sandwiched between the first main capacitor electrode portion 300c of the upper capacitor electrode 300 and the third main portion 60a of the relay electrode 6a2 is denoted as d0. If so configured, it is possible to make the capacitance value of the storage capacitor 70b between the first main capacitor electrode portion 300c of the upper capacitor electrode 300 and the third main portion 60a of the relay electrode 6a2 relatively large. That is, such a configuration is advantageous in that it is possible to make the accumulation/storage amount of electric charge larger than otherwise.

As explained above, in the configuration of a liquid crystal device according to the present embodiment of the invention, the third main portion 60a of the relay electrode 6a2 is formed as a capacitor electrode so that the storage capacitor 70b has a dual-layer structure. In addition, in the configuration of a liquid crystal device according to the present embodiment of the invention, the above-described part of the inter-bedded insulation film 42 that is sandwiched between the first main capacitor electrode portion 300c of the upper capacitor electrode 300 and the third main portion 60a of the relay electrode 6a2 functions as a dielectric film. With such a layer/lamination structure, it is possible to simplify the manufacturing process of an electro-optical device.

Figure 9:
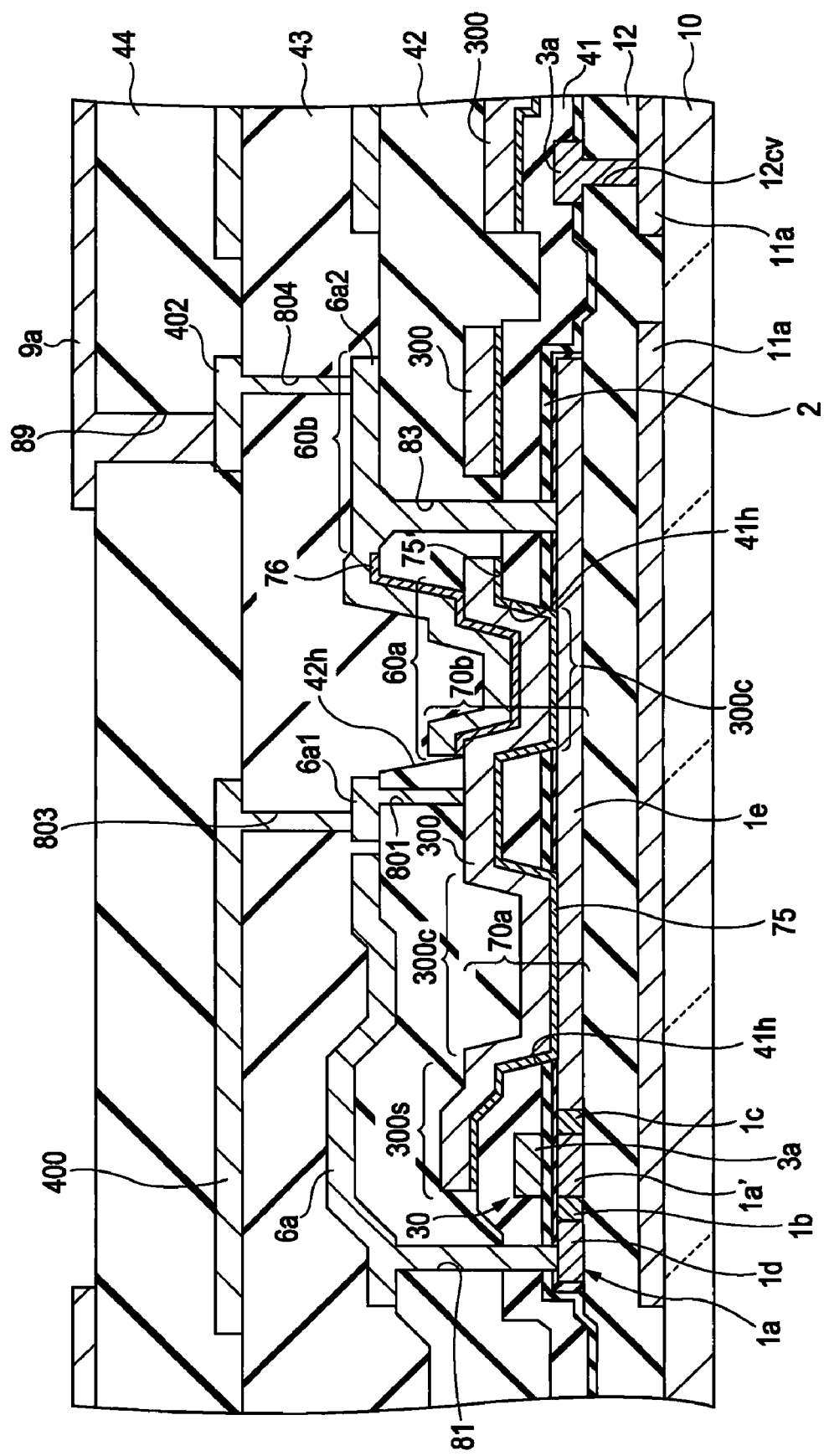
FIG. 9 is a sectional view that schematically illustrates an example of the modified configuration of a pixel unit according to the second exemplary embodiment of the invention; or, more specifically.

In the following description, a modified configuration example of a liquid crystal device according to the second embodiment of the invention described above is explained while referring to FIG. 9. FIG. 9 is a sectional view that schematically illustrates an example of the modified configuration of a pixel unit according to the second exemplary embodiment of the invention. It should be noted that FIG. 9 shows the layer/lamination structure of a pixel unit according to the modified second exemplary embodiment of the invention that corresponds to the layer/lamination structure of a pixel unit according to the first exemplary embodiment of the invention shown in FIG. 6.

In the modified layer/lamination structure shown in FIG. 9, the inter-bedded insulation film 42 has a second open area 42$h$ at a region/area at which the first main capacitor electrode portion 300$c$ of the upper capacitor electrode 300 and the third main portion 60$a$ of the relay electrode 6$a$2 are provided opposite to each other. The second open area 42$h$ of the inter-bedded insulation film 42 exposes the surface of the first main capacitor electrode portion 300$c$ of the upper capacitor electrode 300. The third main portion 60$a$ of the relay electrode 6$a$2 is formed inside the second open area 42$h$. The third main portion 60$a$ of the relay electrode 6$a$2 is formed opposite to the first main capacitor electrode portion 300$c$ of the upper capacitor electrode 300. A dielectric film 76 is formed between the first main capacitor electrode portion 300$c$ of the upper capacitor electrode 300 and the third main portion 60$a$ of the relay electrode 6$a$2.

In the above-explained modified layer/lamination structure of a liquid crystal device according to the second embodiment of the invention, if the thickness of the dielectric film 76 is formed to be relatively thin inside the second open area 42$h$, it is possible to make the capacitance value of the storage capacitor 70$b$ between the first main capacitor electrode portion 300$c$ of the upper capacitor electrode 300 and the third main portion 60$a$ of the relay electrode 6$a$ relatively large. Such a configuration is advantageous in that it is possible to achieve a larger electric-charge accumulation/storage amount.

Third Embodiment

Next, with reference to FIG. 10, a liquid crystal device according to a third exemplary embodiment of the invention is explained below.

The layer/lamination structure of each pixel of a liquid crystal device according to the third embodiment of the invention differs from the layer/lamination structure of each pixel of a liquid crystal device according to the foregoing first embodiment of the invention and the layer/lamination structure of each pixel of a liquid crystal device according to the foregoing second embodiment of the invention in that, in the configuration of a liquid crystal device according to the third embodiment of the invention described below, one storage capacitor is formed above the planar storage capacitor(s) of a liquid crystal device according to the foregoing first embodiment of the invention or the foregoing second embodiment of the invention. More specifically, in the configuration of a liquid crystal device according to the third embodiment of the invention described below, the upper-layer storage capacitor that is formed above the other storage capacitor having a planar structure is made of the third-layer upper capacitor electrode and the fourth-layer relay electrode. In the following description of a liquid crystal device according to the third embodiment of the invention, differences in the layer/lamination structure thereof from that of the liquid crystal device according to the first embodiment of the invention and the liquid crystal device according to the second embodiment of the invention described above are mainly explained while making reference to FIG. 10 as well as the above-referenced FIGS. 1-8. Therefore, in the following description of the liquid crystal device according to the third embodiment of the invention, the same reference numerals are consistently used for the same components as those of the liquid crystal device according to the first embodiment of the invention and/or the liquid crystal device according to the second embodiment of the invention so as to omit, if appropriate, any redundant explanation or simplify explanation thereof.

Figure 10:
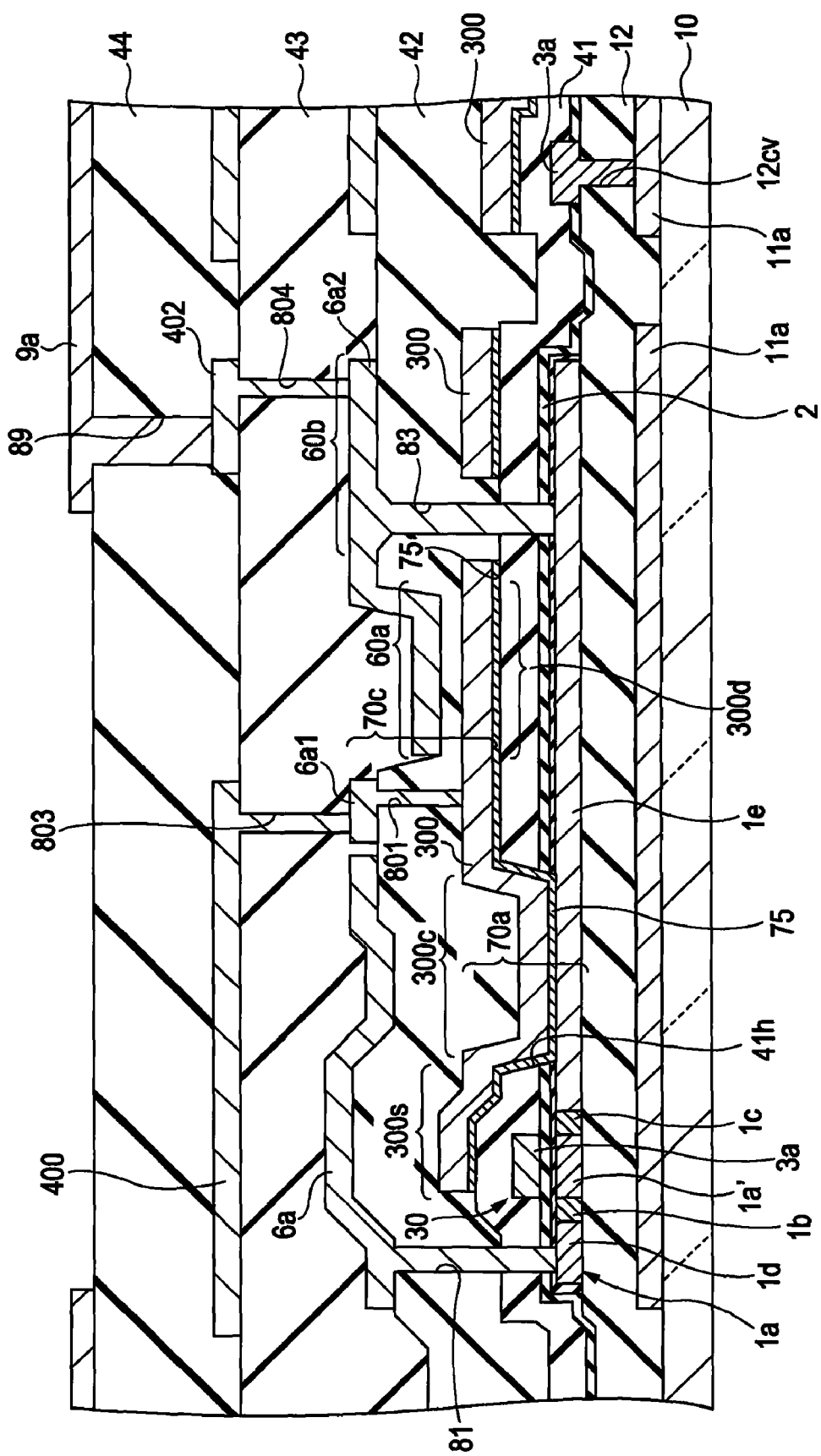
FIG. 10 is a sectional view that schematically illustrates an example of the configuration of a pixel unit according to a third exemplary embodiment of the invention; or, more specifically.

FIG. 10 is a sectional view that schematically illustrates an example of the configuration of a pixel unit according to the third exemplary embodiment of the invention. It should be noted that FIG. 10 shows the layer/lamination structure of a pixel unit according to the third exemplary embodiment of the invention that corresponds to the layer/lamination structure of a pixel unit according to the first exemplary embodiment of the invention shown in FIG. 6 and/or the layer/lamination structure of a pixel unit according to the second exemplary embodiment of the invention shown in FIG. 7.

As illustrated in FIG. 10, in the layer/lamination structure of a liquid crystal device according to the present embodiment of the invention, the inter-bedded insulation film 41 has the first open area 41$h$, which partially exposes the surface of the pixel-electrode-side source/drain region 1$e$ of the semiconductor layer 1$a$ toward upper layers. As in the configuration of a liquid crystal device according to the foregoing first embodiment of the invention explained above while making reference to the plan view of FIG. 5, the first open area 41$h$ of the inter-bedded insulation film 41 according to the present embodiment of the invention partially exposes the surface of the pixel-electrode-side source/drain region 1$e$ of the semiconductor layer 1$a$ inside the above-mentioned Y-directional extending portion of the pixel-electrode-side source/drain region 1$e$ of the semiconductor layer 1$a$. In addition, in the configuration of a liquid crystal device according to the third embodiment of the invention described herein, the upper capacitor electrode 300 has a second main capacitor electrode portion 300$d$ in place of the first main capacitor electrode portion 300$c$ according to the first embodiment of the invention or according to the second embodiment of the invention. As shown in FIG. 10, the second main capacitor electrode portion 300$d$ of the upper capacitor electrode 300 is formed at the third layer. In the configuration of a liquid crystal device according to the third embodiment of the invention described herein, the second main capacitor electrode portion 300$d$ is formed in the above-mentioned X-directional extending portion of the upper capacitor electrode 300 shown in FIG. 5.

As illustrated in FIG. 10, in the layer/lamination structure of a liquid crystal device according to the present embodiment of the invention, the relay electrode 6$a$2 formed at the fourth layer has the third main portion 60$a$ and the relay portion 60$b$. The third main portion 60$a$ of the relay electrode 6$a$2 is provided opposite to the second main capacitor electrode portion 300$d$ of the upper capacitor electrode 300. The second main capacitor electrode portion 300$d$ of the upper capacitor electrode 300, the third main portion 60$a$ of the relay electrode 6$a$2, and a part of the inter-bedded insulation film 42 that is deposited between the second main capacitor electrode portion 300$d$ of the upper capacitor electrode 300 and the third main portion 60$a$ of the relay electrode 6$a$2 make up a storage capacitor 70$c$. The storage capacitor 70$c$ is a non-limiting example of "a second storage capacitor" according to an aspect of the invention.

Referring back to FIG. 5, in the configuration of a liquid crystal device according to the present embodiment of the invention, the storage capacitor 70*c* shown in FIG. 10, which is formed above the storage capacitor 70*a*, is formed in place of the storage capacitor 70*b* in the above-mentioned X-directional extending portion of the upper capacitor electrode 300, or, in other words, the X-directional extending portion of the pixel-electrode-side source/drain region 1*e* of the semiconductor layer 1*a*. It should be noted that, in the configuration of a liquid crystal device according to the foregoing first or second embodiment of the invention, the storage capacitor 70*b* is formed at the same layer as the storage capacitor 70*a*. In addition, in the configuration of a liquid crystal device according to the present embodiment of the invention, the storage capacitor 70*a* having a planar structure is formed in the above-mentioned Y-directional extending portion thereof.

In the configuration of a liquid crystal device according to the third exemplary embodiment of the invention described above, electric charge is accumulated/stored at the upper-layer storage capacitor 70*c* in addition to the lower-layer storage capacitor 70*a*. Therefore, it is possible to accumulate/store a larger amount of electric charge thereat.

Electronic Apparatus

Figure 11:
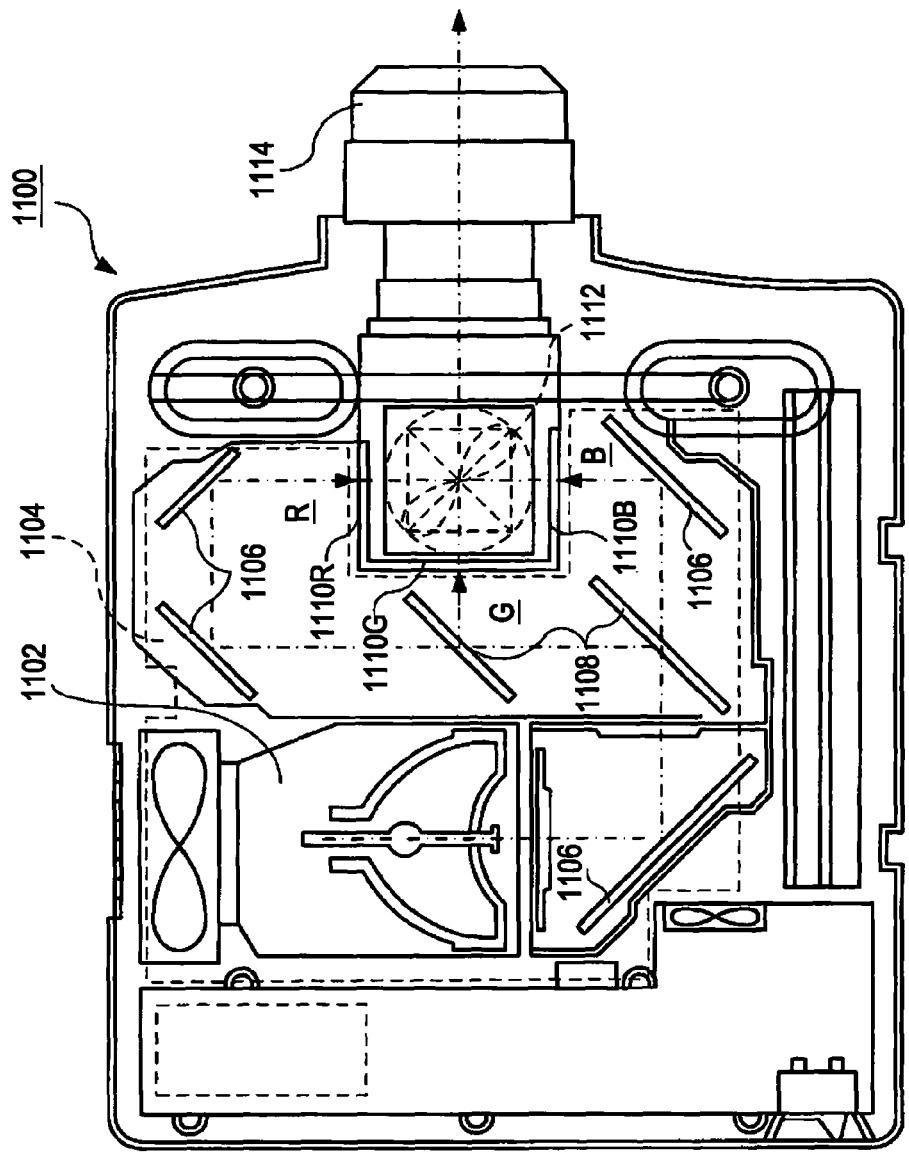
FIG. 11 is a plan view that schematically illustrates an example of the configuration of a projector, which is an example of electronic apparatuses to which a liquid crystal device according to an exemplary embodiment of the invention is applied.

Next, an explanation is given on the application of the above-described liquid crystal device, which is an example of an electro-optical device, to various kinds of electronic apparatuses. FIG. 11 is a plan view that schematically illustrates an example of the configuration of a projector. In the following description, an explanation is given of a projector that employs the above-described liquid crystal device as a light valve.

As illustrated in FIG. 11, a lamp unit 1102, which is made of a white light source such as a halogen lamp, is provided in a projector 1100. A projection light that is emitted from the lamp unit 1102 is separated into three primary color components of R, G, and B by four mirrors 1106 and two dichroic mirrors 1108 arranged in a light guide 1104. The separated primary color components of R, G, and B enter liquid crystal panels 1110R, 1110B, and 1110G, respectively, which function as light valves corresponding to the respective primary color components.

The configuration of the liquid crystal panel 1110R, 1110G, or 1110B is the same as or similar to that of the liquid crystal device described above. Each of these liquid crystal panels 1110R, 1110G, and 1110B is driven by the corresponding one of the primary color signals R, G, and B, which are supplied from an image signal processing circuit. Light subjected to optical modulation by one of these liquid crystal panels enters a dichroic prism 1112 from the corresponding one of three directions. Light of R color component and light of B color component are refracted at a 90-degree angle at the dichroic prism 1112, whereas light of G color component goes straight through the dichroic prism 1112. Therefore, as a result of combination of these color components, a color image is projected on a screen, etc., through a projection lens 1114.

Among a variety of electronic apparatuses to which the electro-optical device according to an aspect the invention could be embodied are, in addition to the electronic apparatus (projector) explained above with reference to FIG. 11, a mobile-type personal computer, a mobile phone, a liquid crystal display television, a viewfinder-type video recorder, a video recorder of a direct monitor view type, a car navigation device, a pager, an electronic personal organizer, an electronic calculator, a word processor, a workstation, a videophone, a POS terminal, a touch-panel device, and so forth. Needless to say, the invention is also applicable to these various electronic apparatuses without any limitation to those mentioned above.

In addition to the liquid crystal device explained in the exemplary embodiments described above, the invention is also applicable to a reflective liquid crystal display which has elements formed on a silicon substrate (LCOS, liquid crystal on silicon), though not limited thereto.

The present invention should be in no case interpreted to be limited to the specific embodiments described above. The invention may be modified, altered, changed, adapted, and/or improved within a range not departing from the gist and/or spirit of the invention apprehended by a person skilled in the art from explicit and implicit description given herein as well as appended claims. An electro-optical device subjected to such a modification, alteration, change, adaptation, and/or improvement and an electronic apparatus that is provided with such an electro-optical device are also within the technical scope of the invention.

The entire disclosure of Japanese Patent Application No. 2007-215763, filed Aug. 22, 2007 is expressly incorporated by reference herein.

What is claimed is:

1. An electro-optical device comprising:
    a plurality of data lines and a plurality of scanning lines that intersect each other;
    a plurality of pixel electrodes each in pixels at positions corresponding to intersections between the data lines and the scanning lines;
    a plurality of transistors each being formed in a corresponding pixel, each of the transistors including a semiconductor film and a gate electrode, the semiconductor film of each transistor having a channel region, a data-line-side source/drain region that is electrically connected to the data line, a pixel-electrode-side source/drain region that is electrically connected to the pixel electrode, a first junction region that is formed between the channel region and the data-line-side source/drain region, and a second junction region that is formed between the channel region and the pixel-electrode-side source/drain region, the gate electrode of the transistor overlapping the channel region;
    a plurality of first storage capacitors each in a corresponding pixel, each first storage capacitor having:
        a first capacitor electrode that is made of the same film as one of the semiconductor films and
        a second capacitor electrode provided at a layer over the gate electrode and opposite to the first capacitor electrode with a first dielectric film being formed between the first capacitor electrode and the second capacitor electrode, the second capacitor electrode has a first main portion that is formed opposite to the first capacitor electrode and an extending portion that extends from the first main portion to at least partially cover the second junction region; and
    an interlayer insulation film that insulates the extending portion from the transistor.

2. The electro-optical device according to claim 1, the interlayer insulation film includes a first interlayer insulation film that has a first opening at an area where the first main portion of the second capacitor electrode is located.

3. The electro-optical device according to claim 1, wherein the second capacitor electrode has more than one first main portion.

4. The electro-optical device according to claim 1, further comprising a third capacitor electrode that is provided at a layer over the second capacitor electrode, the third capacitor electrode being provided opposite to the first main portion of the second capacitor electrode with a second dielectric film being formed between the third capacitor electrode and the first main portion of the second capacitor electrode.

5. The electro-optical device according to claim 1, further comprising a second storage capacitor that has a third capacitor electrode that is provided at a layer over the second capacitor electrode, the third capacitor electrode being provided opposite to the second capacitor electrode with a second dielectric film being formed between the third capacitor electrode and the second capacitor electrode, wherein a second main portion of the second capacitor electrode that extends from the first main portion of the second capacitor electrode is formed opposite to the third capacitor electrode.

6. The electro-optical device according to claim 4, further comprising a second interlayer insulation film at a layer under the third capacitor electrode but over the second capacitor electrode.

7. The electro-optical device according to claim 6, wherein the thickness of the second interlayer insulation film measured at an area where the second capacitor electrode and the third capacitor electrode are provided opposite to each other is smaller in comparison with the thickness of the second interlayer insulation film measured at any other remaining area.

8. The electro-optical device according to claim 6, wherein the second interlayer insulation film has a second opening at the area where the second capacitor electrode and the third capacitor electrode are provided opposite to each other; and the second opening partially exposes the surface of the second capacitor electrode.

9. The electro-optical device according to claim 4, wherein the third capacitor electrode has a third main portion that is formed opposite to the second capacitor electrode and further has a relay portion that extends from the third main portion so as to provide an electric connection between the pixel electrode and the pixel-electrode-side source/drain region.

10. The electro-optical device according to claim 4, wherein the third capacitor electrode is formed at the same layer as that of the data line.

11. An electronic apparatus that is provided with the electro-optical device according to claim 1.

* * * * *